United States Patent
Tsuchiya et al.

(10) Patent No.: US 10,350,778 B2
(45) Date of Patent: Jul. 16, 2019

(54) SLITTER AND SLITTER CONTROL PROGRAM

(71) Applicant: KABUSHIKI KAISHA ISOWA, Nagoya-shi, Aichi (JP)

(72) Inventors: Satoru Tsuchiya, Kasugai (JP); Kunihiro Kawachi, Kasugai (JP)

(73) Assignee: KABUSHIKI KAISHA ISOWA, Aichi (JP)

( * ) Notice: Subject to any disclaimer, the term of this patent is extended or adjusted under 35 U.S.C. 154(b) by 233 days.

(21) Appl. No.: 15/079,582

(22) Filed: Mar. 24, 2016

(65) Prior Publication Data

US 2016/0361830 A1  Dec. 15, 2016

(30) Foreign Application Priority Data

Jun. 12, 2015 (JP) ................. 2015-119827

(51) Int. Cl.
*B26D 5/00* (2006.01)
*B26D 7/26* (2006.01)
*G05B 19/18* (2006.01)

(52) U.S. Cl.
CPC ......... *B26D 5/005* (2013.01); *B26D 7/2635* (2013.01); *G05B 19/182* (2013.01); *G05B 2219/45039* (2013.01)

(58) Field of Classification Search
CPC .... B26D 5/005; B26D 7/2635; G05B 19/182; G05B 2219/45039
USPC ........................................ 700/160
See application file for complete search history.

(56) References Cited

U.S. PATENT DOCUMENTS

| | | | |
|---|---|---|---|
| 8,707,838 B2 * | 4/2014 | Supe-Dienes | B26D 7/2635 83/500 |
| 2004/0221699 A1 | 11/2004 | Adachi et al. | |
| 2011/0162497 A1 * | 7/2011 | Yamamoto | A61F 13/15739 83/55 |

FOREIGN PATENT DOCUMENTS

| | | |
|---|---|---|
| JP | 8-47891 A | 2/1996 |
| JP | 2533918 B2 | 6/1996 |
| JP | 10-86093 A | 4/1998 |
| JP | 2004-330351 A | 11/2004 |
| JP | 4497554 B2 | 4/2010 |

* cited by examiner

*Primary Examiner* — Robert E Fennema
*Assistant Examiner* — Christopher W Carter
(74) *Attorney, Agent, or Firm* — Brinks Gilson & Lione

(57) ABSTRACT

Disclosed is a slitter which comprises: a plurality of slitter heads arranged along and positionally adjustably in a width direction perpendicular to a conveyance direction of a corrugated paperboard, wherein each of the plurality of slitter heads includes a circular slitter blade and a drive motor for rotating the slitter blade; a blade radius acquisition unit operable to acquire respective radii of the plurality of slitter blades; and a control unit operable, based on the radii of the plurality of slitter blades acquired by the blade radius acquisition unit, to control respective rotational speeds of the plurality of drive motors so as to allow respective blade edges of the plurality of slitter blades to have the same circumferential speed.

3 Claims, 13 Drawing Sheets

SLITTER AND SLITTER CONTROL PROGRAM

RELATED APPLICATIONS

This application claims priority under 35 U.S.C. § 119 to Japanese Patent Application No. 2015-119827 filed on Jun. 12, 2015, the entire contents of which is hereby incorporated by reference.

BACKGROUND OF THE INVENTION

1. Field of the Invention

The present invention relates to a slitter in which a plurality of slitter heads are arranged along and positionally adjustably in a width direction perpendicular to a conveyance direction of a corrugated paperboard, wherein each of the slitter heads comprises a drive motor and a circular slitter blade configured to be independently rotated by the drive motor.

2. Description of the Related Art

Heretofore, there have been proposed various configurations for a type of slitter in which a plurality of slitter heads are arranged along and positionally adjustably in a width direction. For example, a slitter described in the following Patent Document 1 comprises: a plurality of slitter heads; a measurement unit for measuring respective radii of a plurality of slitter blades each comprised in a respective one of the slitter heads; and a head control unit for calculating respective wear amounts of the slitter blades based on the measured radii, and adjusting respective engagement amount between corresponding ones of the slitter blades and a plurality of slitter blade receiving members, according to the wear amounts. Each of the slitter heads further comprises a drive motor for rotating the slitter blades. The slitter described in the Patent Document 1 is capable of adjusting respective engagement amounts between corresponding ones of the slitter blades and the slitter blade receiving members, thereby making it possible to stably cut a corrugated paperboard.

A slitter described in the following Patent Document 2 comprises: a plurality of slitter heads; one drive motor for driving a plurality of slitter blades each comprised in a respective one of the slitter heads; and a motor control unit for variably controlling a speed of the drive motor. The motor control unit is configured to control a rotational speed of the drive motor, according to a speed command selected based on a type of corrugated paperboard, properties of raw paperboard, a type of flute, ambient temperature and ambient humidity which are input through an external input device. Based on this variable speed control of the drive motor, the slitter described in the Patent Document 2 makes it possible to maintain sharpness of a cut edge of a corrugated paperboard without occurrence of any irregular cut edge.

CITATION LIST

Patent Document

Patent Document 1: JP 2004-330351A
Patent Document 2: JP 08-047891A

SUMMARY OF THE INVENTION

Technical Problem

As described in the Patent Document 1, the wear amount of the slitter blade in each of the respective slitter heads varies depending on a cutting travel distance of the slitter blade. Therefore, along with repeatedly performing cutting of a corrugated paperboard, the radius of the slitter blade will become largely different between ones of the slitter heads. With a focus on the phenomenon that the wear amount of the slitter blade is different between ones of the slitter heads, the slitter described in the Patent Document 1 is configured to adjust respective engagement amounts between corresponding ones of the slitter blades and the slitter blade receiving members.

The slitter described in the Patent Document 2 is configured to control the rotational speed of each of the slitter blades according to various conditions such as requirements (specifications) of a corrugated paperboard and an ambient environment, independently of a conveyance speed of the corrugated paperboard.

Although the techniques described in the two Patent Documents are intended to enhance cutting performance of a slitter, they do not take into consideration a conveyance state of a corrugated paperboard to be cut in a conveyance direction of the corrugated paperboard by the slitter. In this regard, the present inventors focused on the fact that a corrugated paperboard is often conveyed while obliquely traveling, when the corrugated paperboard is cut by the slitter, and found that the oblique travel occurs in connection with the phenomenon that the wear amount of the slitter blade is different between ones of the slitter heads. Specifically, in the case where each of the slitter blades is configured to be rotated by a respective one of a plurality of separate drive motors, wherein rotational speeds of the separate drive motors are set to the same value and thereby all of the slitter blades are rotated at the same rotational speed, a circumferential speed of a blade edge of the slitter blade is different between ones of the slitter heads due to a difference in wear amount—between the slitter blades. Due to a difference in circumferential speed of the blade edge, when each of a plurality of cut areas of the corrugated paperboard is being cut by a respective one of the blade edges of the slitter blades while being kept in contact therewith, a speed of the cut area in the conveyance direction becomes different between ones of the cut areas. The inventors found that, a difference in speed in the conveyance direction between ones of the cut areas causes the oblique travel during the cutting using the slitter.

Therefore, the present invention has been made in view of the above circumstances, and an object thereof is to provide a slitter capable of reducing an oblique travel of a corrugated paperboard during cutting performed in a conveyance direction of the corrugated paperboard.

Solution to Technical Problem

According to a first aspect of the present invention, there is provided a slitter which comprises: a plurality of slitter heads arranged along and positionally adjustably in a width direction perpendicular to a conveyance direction of a corrugated paperboard, wherein each of the plurality of slitter heads includes a circular slitter blade and a drive motor for rotating the slitter blade; a blade radius acquisition unit operable to acquire respective radii of the plurality of slitter blades; and a control unit operable, based on the radii of the plurality of slitter blades acquired by the blade radius acquisition unit, to control respective rotational speeds of the plurality of drive motors so as to allow respective blade edges of the plurality of slitter blades to have the same circumferential speed.

In the present invention having the above feature, the rotational speeds of the drive motors are controlled to allow the respective blade edges of the slitter blades to have the same circumferential speed, so that it becomes possible to reduce the oblique travel of the corrugated paperboard during cutting performed in the conveyance direction.

In the first aspect of the present invention, each of the slipper heads may comprise a circular slitter blade and a slitter blade receiving member, or may comprise a pair of circular slitter blades. The slitter blade receiving member may be composed of a plurality of members each separately disposed in a respective one of the plurality of slitter heads, or may be composed of a single member shared by the plurality of slitter heads.

In the first aspect of the present invention, the blade radius acquisition unit may be constructed in various configurations. For example, the blade radius acquisition unit may be constructed as a measurement unit configured to automatically measure the radius of each of the slitter blades. Alternatively, the blade radius acquisition unit may be constructed as an input acceptance unit configured to allow an operator to input a radius of each of the slitter blades obtained by a measurement operation, through an input device to thereby acquire the radius of the slitter blade, or may be constructed as a blade radius determination unit configured to allow an operator to perform an operation of lifting or lowering each of the slitter blade while visually checking whether an amount of engagement between the slitter blade and the slitter blade receiving member or the like becomes a given amount, to thereby determine the radius of the slitter blade according to a lifting/lowering amount of the slitter blade. The measurement unit for automatic measurement may be a single measurement device shared by the plurality of slitter heads, or may be a plurality of measurement devices separately disposed in a respective one of the plurality of slitter heads. A specific configuration of the measurement unit may be an optical measurement device utilizing laser light, or may be a mechanical measurement device such as a device configured to detect a displacement of a grindstone of a grinding mechanism. The specific configuration of the measurement unit may be a device configured to measure a cutting travel distance of each of the slitter blades and estimate the radius of the slitter blade from the measured cutting travel distance.

In the first aspect of the present invention, as regards a timing when the blade radius acquisition unit acquires the radii of the plurality of slitter blades, the blade radius acquisition unit may be configured to perform an acquisition operation with a given period during cutting using the slitter, or may be configured to perform the acquisition operation when the cutting travel distance of each of the slitter blades reaches a given value. Alternatively, the blade radius acquisition unit may be configured to perform the acquisition operation according to an operator's manual operation for commanding the acquisition.

In the first aspect of the present invention, the term "blade edge" of the slitter blade means a peripheral edge of the slitter blade to be engaged with the slitter blade receiving member or another slitter blade.

Preferably, in the slitter according to the first aspect of the present invention, the control unit includes: a reference circumferential speed acquisition section operable to acquire a reference circumferential speed of the blade edge of each of the slitter blades; a command speed calculation section operable, based on the radii of the plurality of slitter blades acquired by the blade radius acquisition unit, and the reference circumferential speed, to calculate respective command speeds for the plurality of drive motors; and a speed control section operable, according to the calculated command speeds, to control the respective rotational speeds of the plurality of drive motors.

In the slitter having this feature, the respective rotational speeds of the plurality of drive motors are controlled to allow the circumferential speed of each of the blade edges of the plurality of slitter blades to become equal to the reference circumferential speed, so that it becomes possible to reduce the oblique travel of the corrugated paperboard during cutting performed in the conveyance direction.

In the above slitter, the reference circumferential speed may be a predetermined circumferential speed, or may be a circumferential speed calculated based on a conveyance speed of the corrugated paperboard, or may be a circumferential speed of the blade edge of one of the plurality of slitter blades which has a largest radius when cutting is performed using the slitter.

More preferably, in the above slitter, the reference circumferential speed acquisition section determines and acquires the reference circumferential speed, based on a conveyance speed of the corrugated paperboard.

In the slitter having this feature, the reference circumferential speed is determined based on the conveyance speed of the corrugated paperboard, so that it becomes possible to stabilize cutting quality of the corrugated paperboard using the slitter blade, even in a situation where the conveyance speed of the corrugated paperboard is changed.

In the above slitter, the reference circumferential speed acquisition section may be configured to calculate the reference circumferential speed, based on the conveyance speed of the corrugated paperboard, or may preliminarily store therein the reference circumferential speed determined based on the conveyance speed of the corrugated paperboard.

More preferably, in the above slitter, the reference circumferential speed acquisition section determines and acquires the reference circumferential speed, based on the conveyance speed of the corrugated paperboard, when the conveyance speed of the corrugated paperboard is equal to or greater than a predetermined conveyance speed, and, acquires, as the reference circumferential speed, a predetermined circumferential speed when the conveyance speed of the corrugated paperboard is less than the predetermined conveyance speed.

In the slitter having this feature, even in a situation where the conveyance speed of the corrugated paperboard is less than the predetermined conveyance speed, the predetermined circumferential speed is acquired as the reference circumferential speed, so that it becomes possible to simplify a processing for determining the reference circumferential speed, while stabilizing the cutting quality of the corrugated paperboard using the slitter blade.

In this connection, with a view to stabilizing the cutting quality of the corrugated paperboard using the slitter blade, the respective rotational speeds of the drive motors are set to allow the circumferential speed of the blade edges of the slitter blades to become greater than the conveyance speed of the corrugated paperboard. Further, as the conveyance speed of the corrugated paperboard becomes higher, each of the rotational speeds of the drive motors is set to a higher value. On the other hand, as the conveyance speed of the corrugated paperboard becomes lower, each of the rotational speeds of the drive motors is set to a lower value. The circumferential speed of the blade edge of each of the slitter blades is determined based on the rotational speed of a corresponding one of the drive motors and the radius of the slitter blade. Thus, when the conveyance speed of the corrugated paperboard is set to a relatively low value, the circumferential speed of the blade edge of the slitter blade is likely to become excessively low, thereby causing a problem of significant deterioration in the cutting quality of the corrugated paperboard using the slitter blade. For this reason, the present inventors experimentally determined a lower limit circumferential speed at which a certain level of the cutting quality can be maintained. The predetermined conveyance speed in the above slitter is determined based on this lower limit circumferential speed.

Preferably, in the above slitter, the reference circumferential speed acquisition section acquires, as the reference circumferential speed, a circumferential speed of the blade edge of a specific one of the plurality of slitter blades which has a largest radius among the radii of the plurality of slitter blades acquired by the blade radius acquisition unit, wherein the command speed calculation section, based on the radii of the plurality of slitter blades acquired by the blade radius acquisition unit, and the reference circumferential speed, to calculate respective command speeds for the drive motors configured to rotate the respective remaining slitter blades other than the specific slitter blade, and the speed control section, according to the calculated command speeds, controls respective rotational speeds of the drive motors for rotating the remaining slitter blades.

In the slitter having this feature, a circumferential speed of the blade edge of the specific slitter blade having the largest radius is acquired as the reference circumferential speed, so that it becomes possible to, during cutting performed in the conveyance direction, reduce the oblique travel of the corrugated paperboard, while performing the cutting in conformity to the highest circumferential speed among the plurality of slitter blades.

Preferably, in the slitter according to the first aspect of the present invention, the blade radius acquisition unit includes a plurality of measurement units each disposed in a respective one of the plurality of slitter heads, to measure a respective one of the radii of the plurality of slitter blades.

The slitter having this feature makes it possible to eliminate a need for, when the radius of the slitter blade in a specific one of the slitter heads is measured, controlling lifting/lowering of the remaining slitter heads, and thus perform an operation of measuring the radius of each of the slitter blades simply and quickly.

According to a second aspect of the present invention, there is provided a slitter control program which is executable by a computer for a slitter, wherein the slitter comprises: a plurality of slitter heads arranged along and positionally adjustably in a width direction perpendicular to a conveyance direction of a corrugated paperboard, wherein each of the plurality of slitter heads includes a circular slitter blade and a drive motor for rotating the respective slitter blades; and a blade radius acquisition unit operable to acquire respective radii of the plurality of slitter blades. The slitter control program is configured to cause the computer to perform a control processing of, based on the radii of the plurality of slitter blades acquired by the blade radius acquisition unit, controlling respective rotational speeds of the plurality of drive motors so as to allow respective blade edges of the plurality of slitter blades to have the same circumferential speed.

DETAILED DESCRIPTION OF THE PREFERRED EMBODIMENTS

<First Embodiment>

Figure 1:
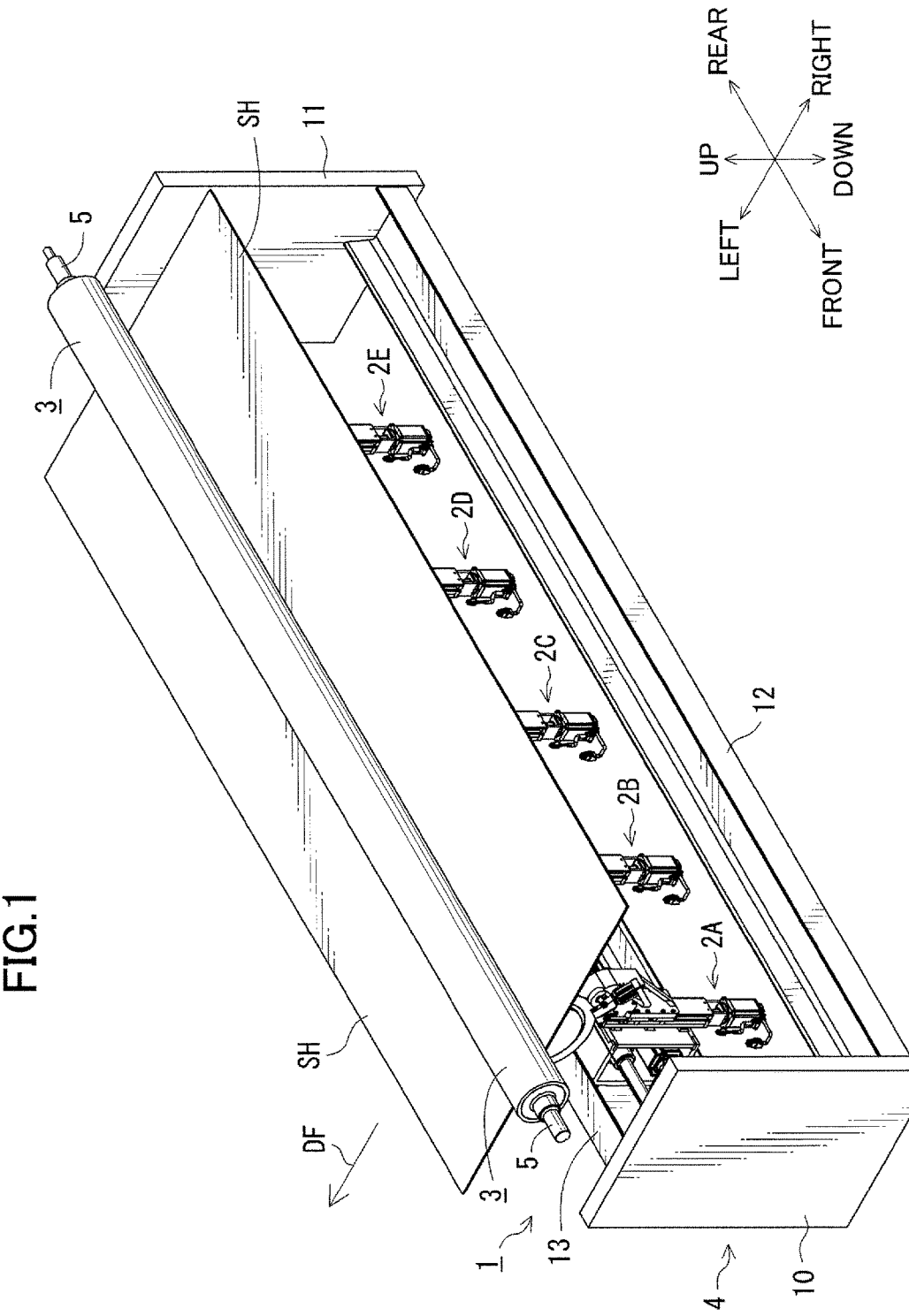
FIG. 1 is a perspective view of a slitter according to a first embodiment of the present invention, when viewed obliquely downwardly from an upper right side thereof.
Figure 2:
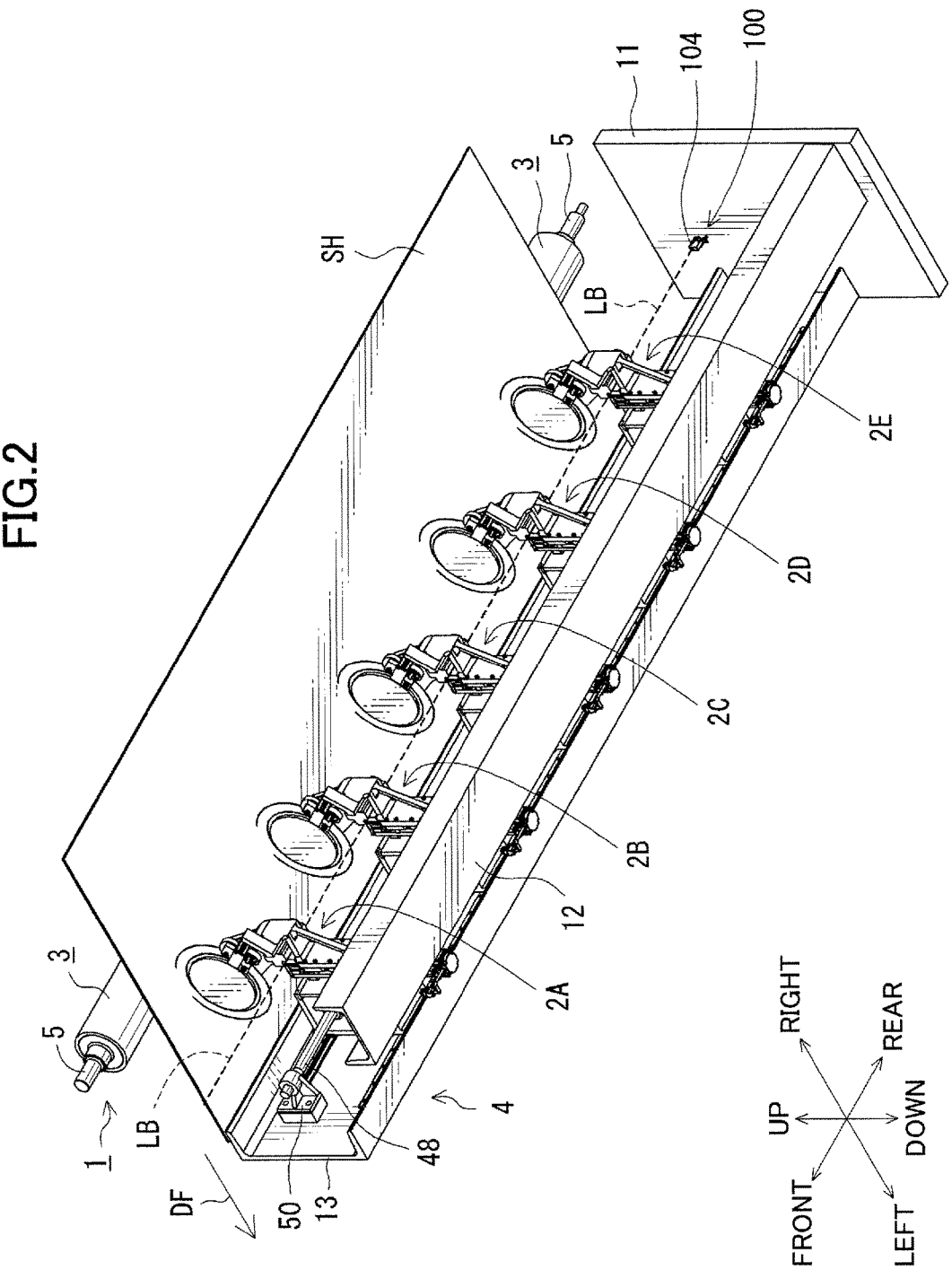
FIG. 2 is a perspective view of the slitter according to the first embodiment in a state after removing a front support plate, when viewed obliquely upwardly from a lower right side thereof.

With reference to FIGS. 1 to 9, a slitter according to a first embodiment of the present invention will now be described. The slitter is an apparatus for cutting a corrugated paperboard produced by a corrugating machine, in a conveyance direction of the corrugated paperboard, wherein a fundamental configuration thereof is well-known as disclosed, for example, in the Patent Document 1. FIG. 1 is a perspective view of the slitter according to the first embodiment, when viewed obliquely downwardly from an upper right side thereof, and FIG. 2 is a perspective view of the slitter, when viewed obliquely upwardly from a lower right side thereof. In FIG. 1, an up-down direction, a right-left direction and a front-rear direction are indicated, respectively, by the double-arrowed lines. Two or more of these directions are described in FIG. 2 and other figures in a similar manner.

In FIGS. 1 and 2, the slitter 1 comprises five slitter heads 2A to 2E, and one blade receiving roll 3. Each of the slitter heads 2A to 2E is disposed below a conveyance plane along which a corrugated paperboard SH is conveyed, and supported by a frame 4 in such a manner as to be positionally adjustable in the front-rear direction. The blade receiving roll 3 is disposed above the conveyance plane along which the corrugated paperboard SH is conveyed, and supported by a support shaft 5 extending in the front-rear direction (width direction). The support shaft 5 is rotatably supported by a member fixed to the frame 4. The frame 4 comprises a front support plate 10, a rear support plate 11, a lower beam 12, and a left beam 13. Each of the lower beam 12 and the left beam 13 is disposed between the front support plate 10 and the rear support plate 11, in a posture extending in the front-rear direction (width direction). The corrugated paperboard SH is conveyed in the right-to-left direction serving as a conveyance direction DF.

[Slitter Heads]

Figure 3:
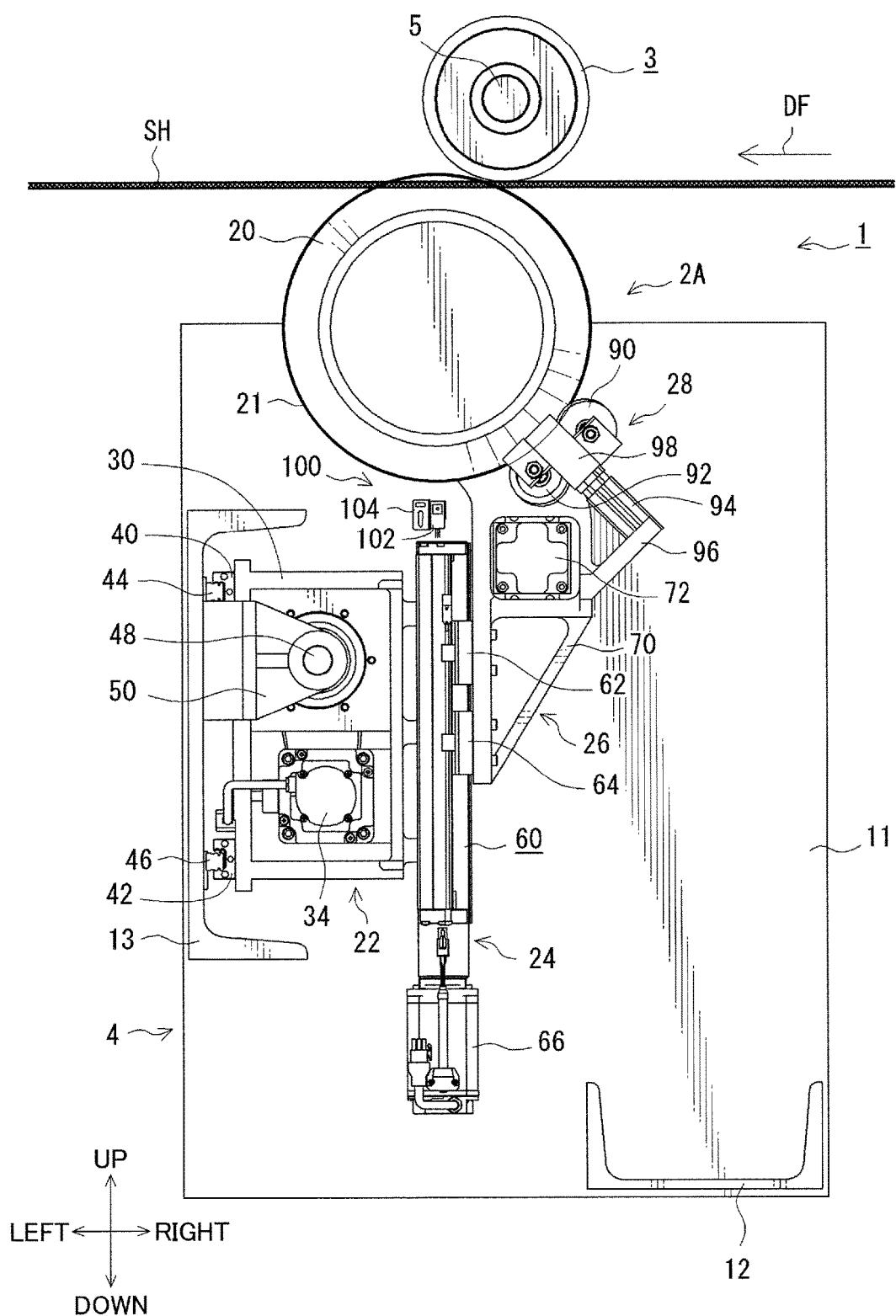
FIG. 3 is an enlarged front view of the slitter according to the first embodiment in a state after removing a front support plate.
Figure 4:
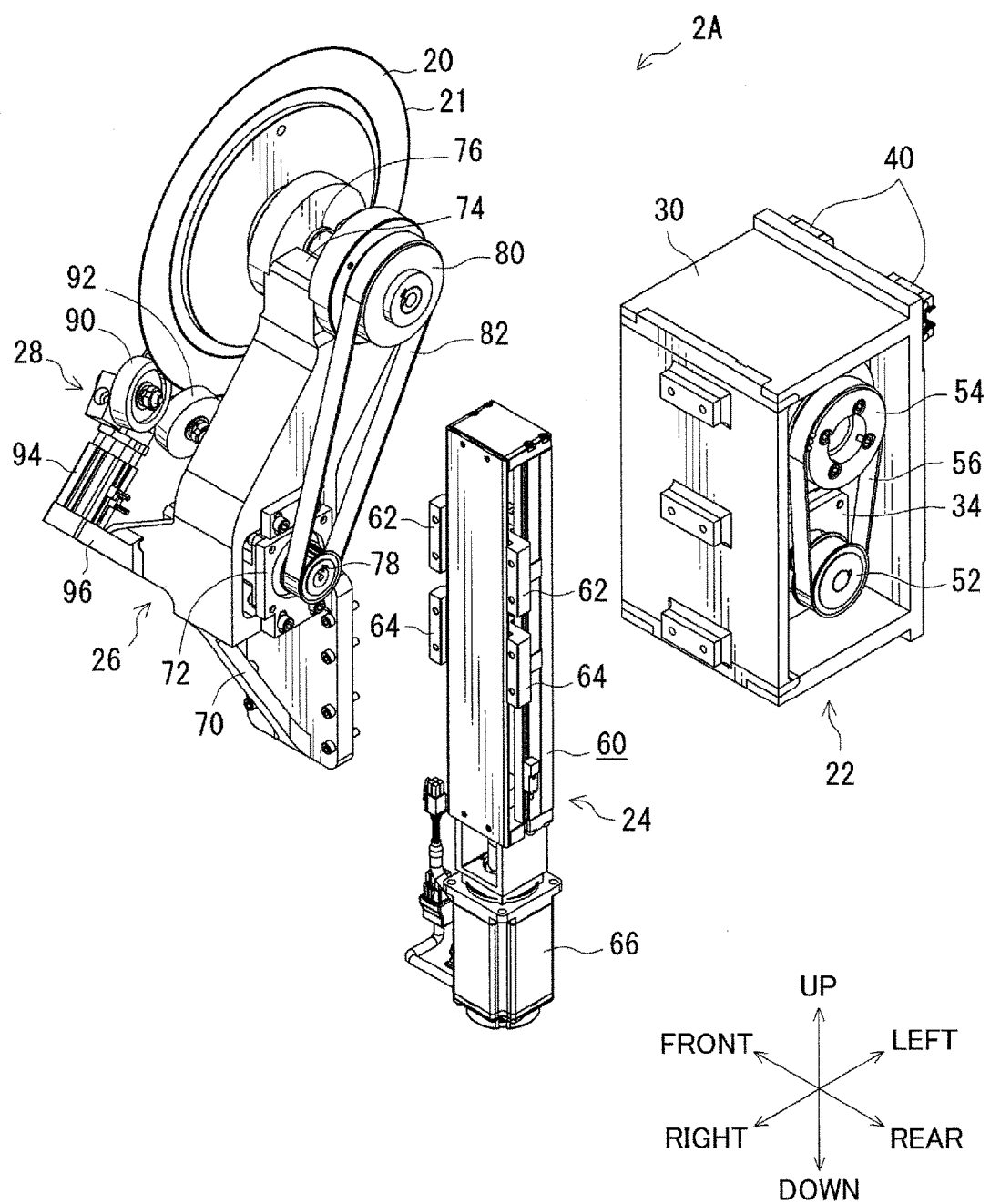
FIG. 4 is an exploded perspective view of a slitter head disassembled from the slitter according to the first embodiment, when viewed obliquely frontwardly from a rear side thereof.

Each of the slitter heads 2A to 2E has the same configuration, and therefore only the slitter head 2A will be described as a representative example. FIG. 3 is a front view of the slitter head 2A and the roll 3, and FIG. 4 is an exploded perspective view of the slitter head 2A itself, when viewed obliquely frontwardly from a rear right side thereof. The slitter head 2A comprises: a transversely moving mechanism 22 for positionally adjusting a slitter blade 20 in the front-rear direction (width direction); a lifting-lowering mechanism 24 for lifting and lowering the slitter blade 20 in the up-down direction; a rotationally driving mechanism 26 for rotating the slitter blade 20; and a grinding mechanism 28 for grinding the slitter blade 20. FIG. 3 depicts a state in which the slitter blade 20 is cutting the corrugated paperboard SH along the conveyance direction, while being engaged with the blade receiving roll 3.

(Transversely Moving Mechanism)

Figure 5:
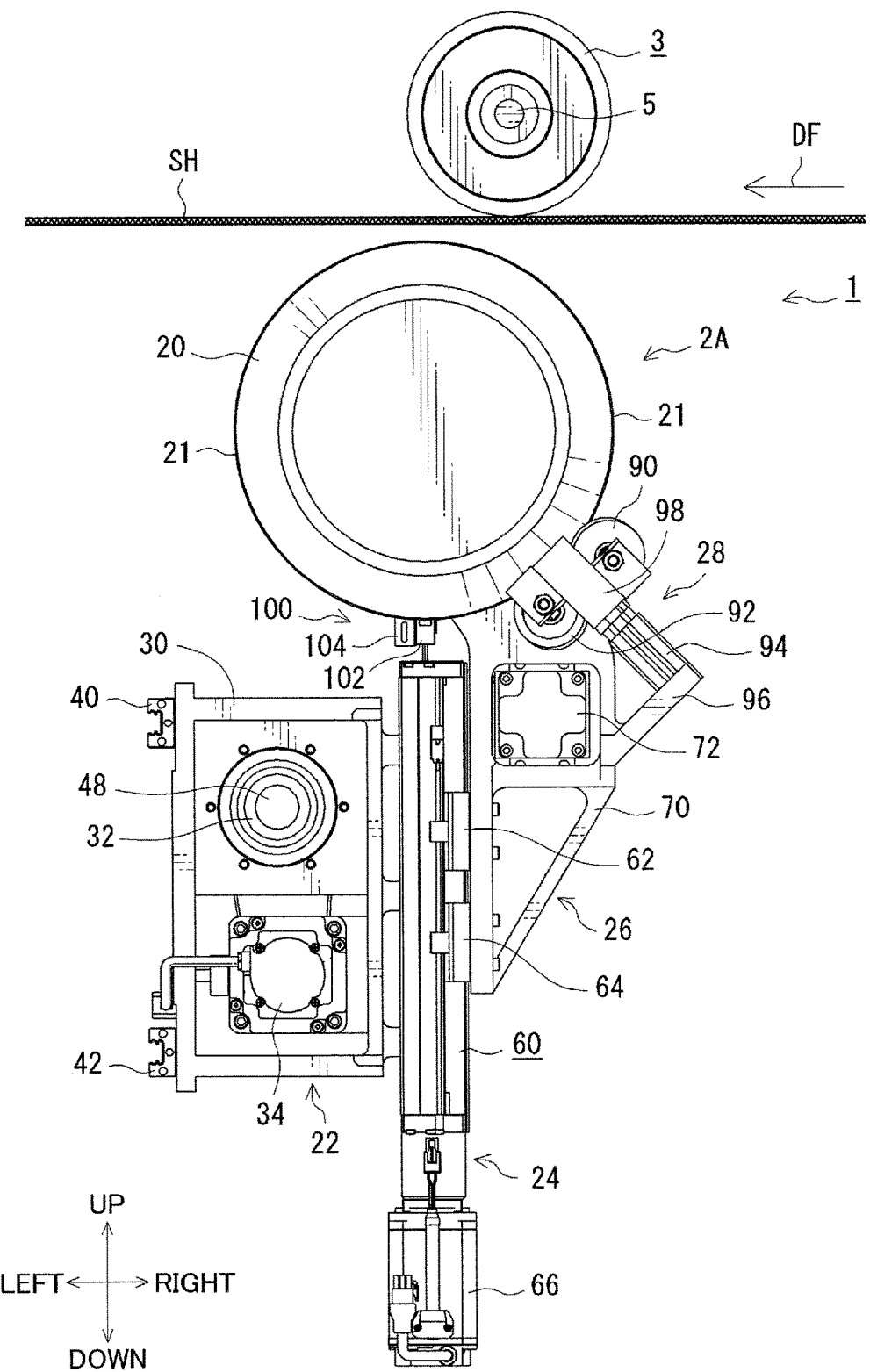
FIG. 5 is an enlarged front view of the slitter according to the first embodiment in a state in which a slitter blade is spaced apart from a blade receiving roll 3.

FIG. 5 is a front view of the slitter 1, wherein the frame 4 is removed therefrom, and the slitter blade 20 is spaced apart from the blade receiving roll 3. In FIG. 5, the transversely moving mechanism 22 primarily comprises a movable block 30, a nut member 32, and a positioning motor 34. In FIG. 3, an upper slidable member 40 and a lower slidable member 42 are fixed to a left side surface of the movable block 30. An upper guide rail 44 and a lower guide rail 46 are fixed to the left beam 13 in a posture where each of them extends the front-rear direction (width direction). Each of the upper slidable member 40 and the lower slidable member 42 is slidingly movable along a corresponding one of the upper guide rail 44 and the lower guide rail 46. A threaded shaft 48 is attached to the left beam 13 through a bracket 50 in a posture where it extends in the front-rear direction as depicted in FIG. 2. The nut member 32 is rotatably supported by the movable block 30, and threadingly engaged with the threaded shaft 48.

The positioning motor 34 is supported by the movable block 30. In FIG. 4, a driving pulley 52 is fixed to an output shaft of the positioning motor 34. A driven pulley 54 is coupled to the nut member 32. A transmission belt 56 is wound between the two pulleys 52, 54 in a tensioned state. According to rotation of the positioning motor 34, the nut member 32 is rotated, and the movable block 30 is moved in the front-rear direction along the two guide rails 44, 46. In this embodiment, the positioning motor 34 is a servomotor incorporating a positioning sensor.

(Lifting-Lowering Mechanism)

The lifting-lowering mechanism 24 primarily comprises a guide block 60, an upper liftable and lowerable member 62, and lower liftable and lowerable member 64, and a lifting-lowering motor 66. The lifting-lowering motor 66 is fixed to a lower end of the guide block 60. According to rotation of the lifting-lowering motor 66, each of the upper liftable and lowerable member 62 and the lower liftable and lowerable member 64 is movable in the up-down direction along the guide block 60. The guide block 60 is attached to a right side surface of the movable block 30 by a screw or the like, in a posture where it stands in the up-down direction as depicted in FIG. 3. The lifting-lowering mechanism 24 is commercially available as "Precision Positioning Table TE" produced by Nippon Thompson Co., Ltd. In this embodiment, the lifting-lowering motor 66 is a servomotor incorporating a positioning sensor.

(Rotationally Driving Mechanism)

The rotationally driving mechanism 26 primarily comprises a support block 70, a driving motor 72, and a bearing 74. The support block 70 is attached to the upper liftable and lowerable member 62 and the lower liftable and lowerable member 64 by a screw or the like. The drive motor 72 is supported by the support block 70. The bearing 74 is disposed on an upper portion of the support block 70, and rotatably supports a rotary shaft 76. The slitter blade 20 is attached to the rotary shaft 76. A driving pulley 78 is fixed to an output shaft of the driving motor 72. A driven pulley 80 is fixed to the rotary shaft 76. A transmission belt 82 is wound between the two pulleys 78, 80 in a tensioned state. According to rotation of the driving motor 72, the slitter blade 20 is rotatable together with the rotary shaft 76. In this embodiment, the driving motor 72 is an inverter motor incorporating a motor speed sensor.

(Grinding Mechanism)

The grinding mechanism 28 primarily comprises a pair of grindstones 90, 92, and an air cylinder 94. A support member 96 is fixed to the support block 70. The air cylinder 94 is attached to the support member 96. The air cylinder 94 comprises an extendable and retractable operation rod. A grindstone mounting member 98 is attached to the operation rod. The two grindstones 90, 92 are rotatably attached to the grindstone mounting member 98. When the air cylinder 94 is activated to cause the operation rod to be extended, the two grindstones 90, 92 are brought into press contact with a blade edge 21 of the slitter blade 20.

Each of the remaining slitter heads 2B to 2E has the same configuration as that of the slitter head 2A. In the following description, when it is desirable to describe an element or component of each of the slitter heads, such that it is distinguishable on a per-slitter head basis, it will be designated by the related reference numeral or sign in FIGS. 3 to 5 to which one of alphabetical letters "A" to "E" corresponding to each of the slitter heads is appended. For example, the slitter blade of the slitter head 2A will be described as the slitter blade 20A, and the slitter blade of the slitter head 2B will be described as the slitter blade 20B.

[Sensors]
(Blade Edge Sensor)

A blade edge sensor 100 is provided to detect respective blade edges of the slitter blades so as to measure respective radii of the slitter blades 20A to 20E of the slitter heads 2A to 2E. The blade edge sensor 100 is composed of an optical sensor which comprises a light-emitting unit 102, a light-receiving unit 104, and a non-depicted reflective plate. The light-emitting unit 102 and the light-receiving unit 104 are attached to the rear support plate 11, and the reflective plate is attached to the front support plate 10. The light-emitting unit 102 and the light-receiving unit 104 are arranged in adjacent relation, as depicted in FIG. 3. The light-emitting unit 102 is configured to emit a laser beam LB parallel to the front-rear direction, toward the reflective plate on the front support plate 10, as indicated by the broken line in FIG. 2. The light-receiving unit 104 is configured to receive the laser beam LB reflected by the reflective plate.

As depicted in FIG. 5, the light-emitting unit 102 and the light-receiving unit 104 are attached to the rear support plate 11 at positions approximately coincident with a position of a lifting-lowering path in the guide block 60, in the right-to-left direction (conveyance direction), so as to detect a lowermost point of the blade edge 21 of the slitter blade 20 when the slitter blade 20 is spaced apart from the blade receiving roll 3. On the other hand, as depicted in FIG. 3, when the slitter blade 20 is engaged with the blade receiving roll 3, the light-emitting unit 102 and the light-receiving unit 104 are located at positions away from the lowermost point of the blade edge 21 of the slitter blade 20. The blade edge sensor 100 is configured to generate a blade edge detection signal when the laser beam LB is partially blocked by the blade edge 21 of the slitter blade 20, and thereby an amount of light received by the light-receiving unit 104 is reached to a given amount.

(Conveyance Speed Sensor)

The corrugating machine is equipped with a heretofore-known conveyance apparatus comprising a plurality of conveyance rollers, for conveying a corrugated paperboard SH. The corrugated paperboard SH to be cut by the slitter 1 is also conveyed by the conveyance apparatus. In order to detect an actual conveyance speed of the conveyance apparatus, a conveyance speed sensor 110 is provided. The conveyance speed sensor 110 is a pulse generator coupled to a main driving motor for rotating the conveyance rollers. The conveyance speed sensor 110 is configured to generate a pulse signal having a frequency proportional to the conveyance speed.

[Electrical Configuration of Slitter]

Figure 6:
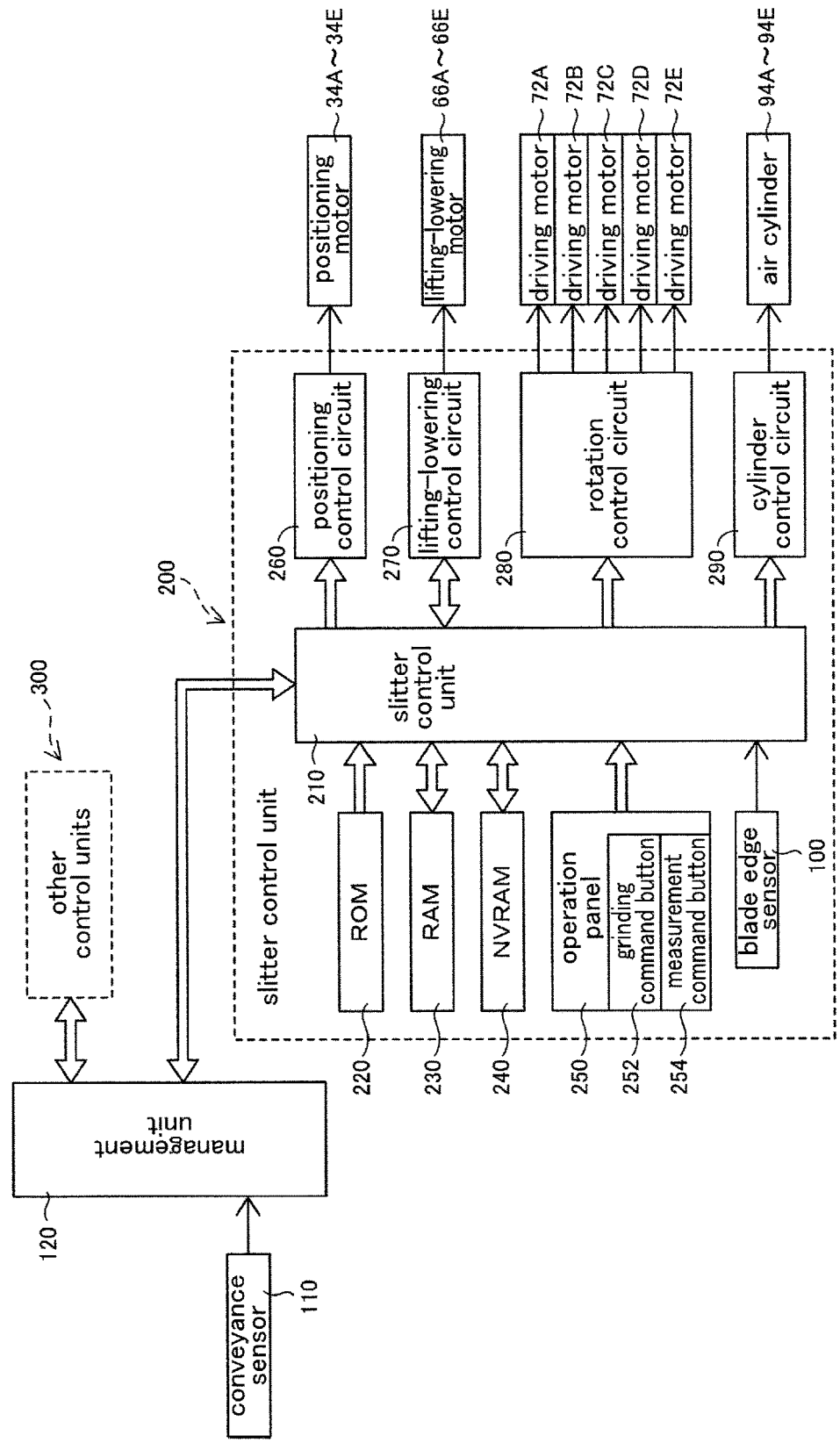
FIG. 6 is a block diagram depicting an electrical configuration of the slitter according to the first embodiment.

With reference to FIG. 6, an electrical structure of the slitter 1 according to the first embodiment will be described. FIG. 6 is a block diagram depicting an electrical configuration of the slitter 1. In FIG. 6, a management apparatus 120 is a device for managing production of a corrugated paperboard when the corrugating machine sequentially performs a large number of orders. The conveyance sensor 110 is connected to the management apparatus 120. The management apparatus 120 is configured to measure an actual conveyance speed, based on a pulse signal from the conveyance sensor 110, and control rotation of the main driving motor in such a manner as to allow the measured actual conveyance speed to become equal to a conveyance speed designated in order to perform each order, or a conveyance speed input and set by an operator. The management apparatus 120 is operable to supply a control command for performing each order, to a slitter control apparatus 200 and other control apparatuses 300. The slitter control apparatus 200 is configured to generally control the cutting operation of the slitter 1. The other control apparatuses 300 are configured to control respective operations of other processing apparatuses such as a single facer, a double facer, a scorer and a cut-off apparatus. The management apparatus 120 is operable to supply, to the slitter control apparatus 200, a control command containing a size and a division number of a corrugated paperboard to be produced according to each order, and the measured actual conveyance speed VF.

The management apparatus 120 and the other control apparatuses 300 have become publicly known, as disclosed, for example, in JP 4497554B.

(Slitter Control Apparatus)

The slitter control apparatus 200 primarily comprises a slitter control section 210, a ROM 220, a RAM 230, a NVRAM 240, an operation panel 250, a positioning control circuit 260, a lifting-lowering control circuit 270, a rotation control circuit 280, and a cylinder control circuit 290. The slitter control section 210 comprises a main CPU and a sub CPU, and makes up a computer in cooperation with a storage device such as the ROM 220, the RAM 230 and the NVRAM 240. The ROM 220 fixedly stores therein various control programs, such as a main control program for executing a main control process depicted in FIG. 7, a measurement control program for executing a measurement control process depicted in FIG. 8, and a rotation control program for executing a rotation control process depicted in FIG. 9, and various set values. The RAM 230 is configured to temporarily store therein a result of calculation processing in the slitter control section 210. The NVRAM 240 is a non-volatile memory capable of maintaining a memory content even during power-off, and is configured to fixedly store therein specific information including a grinding flag GFX and a grinding number (number of times of grinding) GNX processed, respectively, in the main control process and the rotation control process, and a radius RX of the slitter blade 20 calculated in the measurement control process.

The operation panel 250 is equipped with a numerical keypad and a large number of operation buttons to be manually operated by an operator, and a display for displaying a set value input through an operator's operation. Examples of the operation buttons include a grinding command button 252 and a measurement command button 254. The grinding command button 252 is manually operated to generate a command for directing an operation of grinding the slitter blade 20. The measurement command button 254 is manually operated to generate a command for directing an operation of measuring a radius of the slitter blade 20. The operation panel 250 is operable, upon manual operation of the grinding command button 252 or the measurement command button 254, to supply a grinding command or a measurement command to the slitter control section 210.

When the management apparatus 120 supplies, for each order, a control command including an overall crosswise dimension of a corrugated paperboard SH in the front-rear direction, and a division number of the corrugated paperboard SH, to the slitter control apparatus 200, the slitter control section 210 is operable, according to the control command, to determine which of the slitter heads is to be used or not used for cutting. The slitter control section 210 is further operable to create various commands and supply the commands to the control circuits 260 to 290. The positioning control circuit 260 is operable, according to a positioning command from the slitter control section 210, to control rotation and stopping of and a rotation direction of the positioning motors 34A to 34E in the slitter heads 2A to 2E. The lifting-lowering control circuit 270 is operable, according to position commands from the slitter control section 210, to control rotation and stopping of and a rotation direction of the lifting-lowering motors 66A to 66E in the slitter heads 2A to 2E.

The rotation control circuit 280 is operable to receive a control command including a command motor speed (revolution number), from the slitter control section 210, and, according to the received control command, control rotation and stopping of and a rotational speed of the driving motors 72A to 72E in the slitter heads 2A to 2E, on a per-driving motor basis. A specific configuration of the rotation control circuit 280 has been publicly known, as described, for example, in JP 2533918B. The cylinder control circuit 290 is operable, according to an activation command from the slitter control section 210, to control activation and deactivation of the air cylinders 94A to 94E in the slitter heads 2A to 2E.

The blade edge sensor 100 is connected to the slitter control section 210. The blade edge sensor 100 is operable, when it detects the blade edge 21 of the slitter blade 21, to supply a blade edge detection signal to the slitter control section 210.

[Operation and Function in First Embodiment]

An operation and function of the slitter 1 according to the first embodiment will be described below. As the operation and function of the slitter 1, the main control process, the measurement control process and the rotation control process in the slitter 1 will be described with reference to the drawings.

(Main Control Process)

Figure 7:
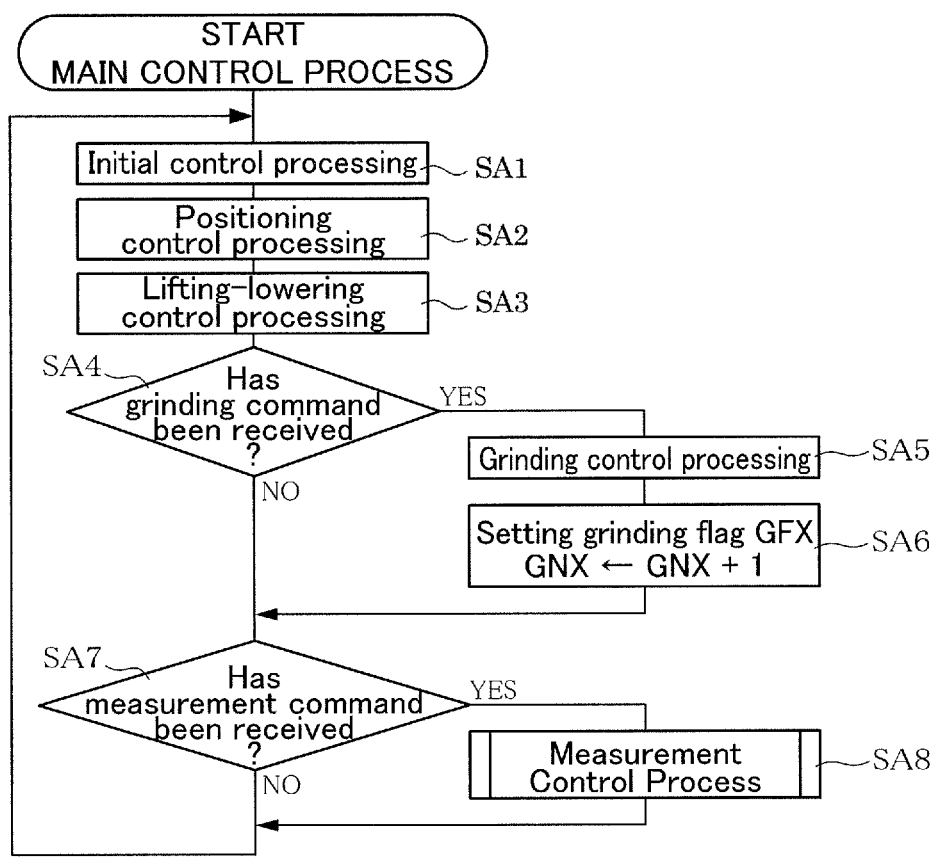
FIG. 7 is a flowchart depicting a main control process to be executed in the slitter according to the first embodiment.

With reference to FIG. 7, the main control process in the slitter 1 will be described. FIG. 7 is a flowchart depicting the main control process in the slitter 1. Processing in each step depicted in FIG. 7 is executed in the maim CPU of the slitter control section 210. Upon applying power to the slitter 1, the main CPU operates to read the main control program from the ROM 220, and start to execute the main control process.

An initial control processing is executed (SA1). Specifically, when, for each order, a control command including an overall crosswise dimension of a corrugated paperboard SH in the front-rear direction, and a division number of the corrugated paperboard SH is supplied from the management apparatus 120 to the slitter control section 210, a head selection commend for selecting which of the slitter heads is to be used or not used for cutting is created according to the supplied control command. In addition, a positioning command designating a positioning position of each of the slitter heads in the front-rear direction is created. Further, a lower position command is supplied to the lifting-lowering control circuit 270 to allow all of the slitter heads 2A to 2E to be positioned at a given lower position. According to the lower position commands, the lifting-lowering control circuit 270 controls rotation of the lifting-lowering motors 66A to 66E. Based on this control, all of the slitter heads 2A to 2E are positioned at the given lower position.

A positioning control processing is executed (SA2). Specifically, the positioning command is supplied to the positioning control circuit 260. According to the positioning command, the positioning control circuit 260 controls rotation of the positioning motors 34A to 34E. Based on this control, in the state in which each of the slitter heads 2A to 2E is positioned at the given lower position, each of the slitter heads 2A to 2E is positioned at a position designated by the positioning command in the front-rear direction.

A lifting-lowering control processing is executed (SA3). Specifically, an upper position command is created depending on a thickness of a corrugated paperboard SH to be processed according to each order. This upper position command and the head selection command are supplied to the lifting-lowering control circuit 270. According to the head selection command, the lifting-lowering control circuit 27 identifies selected ones of the slitter heads to be used, and control rotation of the lifting-lowering motors corresponding to the identified slitter heads. Based on this rotation control of the lifting-lowering motors, each of the identified slitter heads is lifted from the given lower position to an upper position designated by the upper position command, so that the blade edge 21 of the slitter blade 20 in the identified slitter head is engaged with the corresponding blade receiving roll 3, as depicted in FIG. 3.

It is determined whether or not the grinding command has been received (SA4). Specifically, in a situation where an operator considers that it is necessary to grind the slitter blade in a specific one of the slitter heads 2A to 2E, when the operator manually operates the numerical keypad of the operation panel 250 to designate the specific slitter head and then manually operates the grinding command button 252, the operation panel 250 generates slitter head designation information and the grinding command. It is determined whether or not the grinding command has been received by the slitter control section 210. When it is determined that the grinding command has been received (SA4: YES), the routine proceeds to step SA5. When it is determined that the grinding command has not been received (SA4: NO), the routine proceeds to step SA7.

When it is determined that the grinding command has been received, a grinding control processing is executed (SA5). Specifically, when it is determined that the grinding command has been received, the received grinding command and slitter head designation information are supplied to the cylinder control circuit 290. According to the slitter head designation information, the cylinder control circuit 290 specifies a designated one of the slitter heads which is to be grinded, and activates the air cylinder corresponding to the specified slitter head, for a given period of time, according to the grinding command. As a result of the activation of this air cylinder, the two grindstones 90, 92 are pressed against the blade edge 21 of the slitter blade 20 being rotated, so as to perform a grinding operation.

A grinding flag GFX is set, and a grinding number GNX is incremented by one (SA6). Specifically, a grinding flag GFX corresponding to the slitter head which is grinded according to the information of the designated slitter head is set. The grinding flag GFX is fixedly stored in the NVRAM 240. When the step SA6 is executed in the state in which the grinding flag GFX is set, the set state of the grinding flag GFX is maintained. For example, when the slitter blade 20A in the slitter head 2A is grinded, a grinding flag GF1 corresponding to the slitter head 2A is set. Similarly, when the slitter head in one of the slitter heads 2B to 2E is grinded, a corresponding one of four grinding flags GF2 to GF5 is set. Further, every time the slitter blade in a specific one of the slitter heads is grinded, a grinding number GNX corresponding to the specific slitter blade is incremented by one, and fixedly stored in NVRAM 240. For example, regarding the slitter head 2A, in a situation where the grinding flag GF1 is reset, when the slitter blade 20A is initially grinded, a grinding number GN1 corresponding to the slitter head 2A is incremented from "0" to "1". Subsequently, in a situation where the grinding flag GF1 is set, when the slitter blade 20A is secondly grinded, the grinding number GN1 corresponding to the slitter head 2A is incremented from "1" to "2".

It is determined whether or not the measurement command has been received (SA7). Specifically, when an operator manually operates the measurement command button 254, the operation panel 250 generates the measurement command. It is determined whether or not this measurement command has been received by the slitter control section 210. When it is determined that the measurement command has been received (SA7: YES), the routine proceeds to step SA8. When it is determined that the measurement command has not been received (SA7: NO), the routine returns to the step SA1.

When it is determined that the measurement command has been received, the measurement control process is executed (SA8). Details of the measurement control process will be described later. When it is determined that the measurement command has not been received, the processing in the step SA1 and the subsequent steps will be repeatedly executed. During the course of execution of the same order, operational states of the slitter heads 2A to 2E in the steps SA1 to SA3 are maintained. On the other hand, upon change in order, the processing in the steps SA1 to SA3 is executed according to the new order.

(Measurement Control Process)

Figure 8:
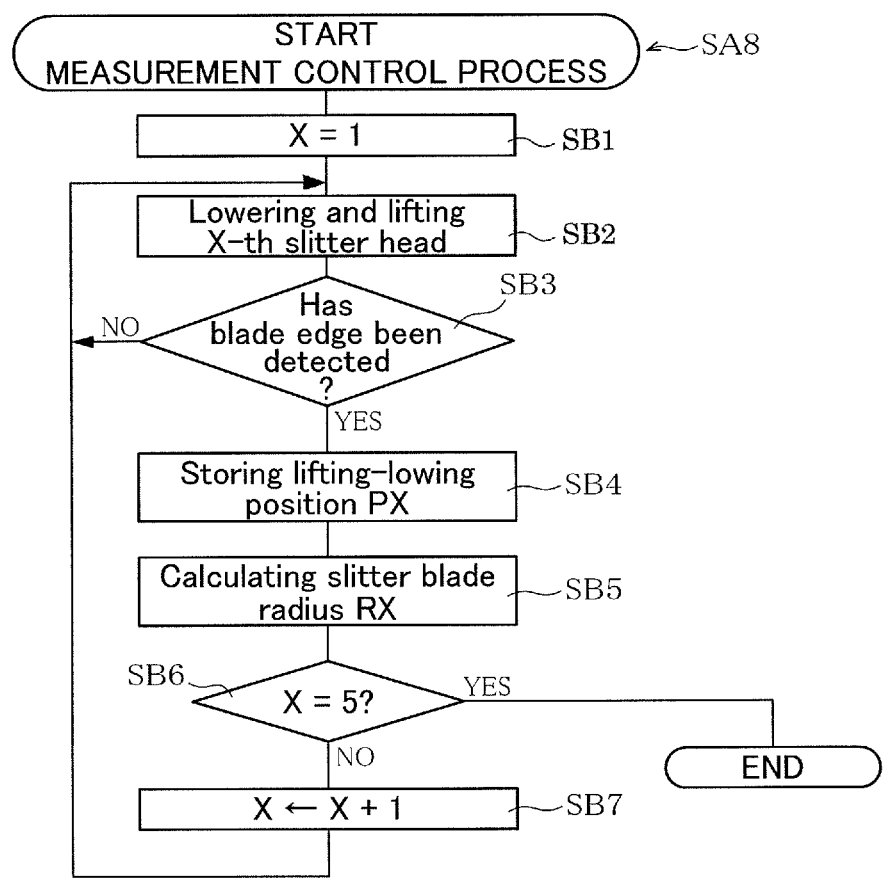
FIG. 8 is a flowchart depicting a measurement control process to be executed in the slitter according to the first embodiment.

With reference to FIG. 8, the measurement control process in the slitter 1 will be described. FIG. 8 is a flowchart depicting the measurement control process in the slitter 1. Processing in each step depicted in FIG. 8 is executed in the maim CPU of the slitter control section 210. Generally, it is often the case that, when a large number of orders on a scheduled day of processing are completed, an operator manually operates the measurement command button 254 to generate a command for directing a measurement of a radius of the slitter blade 20. When the measurement command is generated by the manual operation of the measurement command button 254, the measurement control process depicted in FIG. 8 is started.

Slitter head identification information X is set to "1" (SB1). Five numerals of "1" to "5" are associated, respectively, with the slitter heads 2A to 2E to serve as identification information for identifying the respective slitter heads 2A to 2E. Identification information X, where X is "1", is information identifying the slitter head 2A. Similarly, identification information X, where X is one of "2" to "5", is information identifying a respective one of the slitter heads 2B to 2E.

A command for directing a lifting-lowering operation in regard to the X-th slitter head is generated (SB2). Specifically, the identification information X is set to "1", and thus a measurement rotation control command in regard to the lifting-lowering motor 66A in the 1st slitter head 2A is supplied to the lifting-lowering control circuit 270. Simultaneously, a retraction rotation control command in regard to the lifting-lowering motors 66B to 66E in the remaining slitter heads 2B to 2E is supplied to the lifting-lowering control circuit 270. According to the measurement rotation control command, the lifting-lowering control circuit 270 controls rotation of the lifting-lowering motor 66A in such a manner as to allow the slitter head 2A to be lowered to the given lower position. After the slitter head 2A is positioned at the given lower position, the lifting-lowering control circuit 270 controls rotation of the lifting-lowering motor 66A according to the measurement rotation control command, in such a manner as to allow the slitter head 2A to be lifted upwardly from the given lower position, and, based on an amount of rotation of the lifting-lowering motor 66A, calculates an amount of upward movement of the slitter head 2A with respect to the given lower position. The lifting-lowering control circuit 270 supplies the calculated upward movement amount to the slitter control section 210. The slitter control section 210 sequentially integrates the supplied upward movement amounts, and temporarily stores the integrated value in the RAM 230. The lifting-lowering control circuit 270 also controls rotation of the lifting-lowering motors 66B to 66E according to the retraction rotation control command, in such a manner as to each of the slitter blades 20B to 20E in the remaining slitter heads 2B to 2E to be lifted upwardly to a given upper position free from blocking the laser beam LB of the blade edge sensor 100. Each of the slitter blades 20B to 20E in the remaining slitter heads 2B to 2E is stopped at the given upper position.

FIG. 5 depicts a state when the laser beam LB from the light-emitting unit 102 is partially blocked by the blade edge 21A of the slitter blade 20A in a course of upward movement of the slitter head 2A from the given lower position. On the other hand, FIG. 3 depicts the state in which the blade edge 21A of the slitter blade 20A is engaged with the blade receiving roll 3, wherein the laser beam LB from the light-emitting unit 102 is not blocked by the blade edge 21A of the slitter blade 20A.

It is determined whether or not the blade edge 21 in the X-th slitter head has been detected (SB3). Specifically, on the assumption that the identification information X is currently set to "1", in a course of upward movement of the 1st slitter head 2A, when the laser beam LB from the light-emitting unit 102 of the blade edge sensor 100 is partially blocked by the blade edge 21A of the 1st slitter blade 20A as depicted in FIG. 5, and thereby an amount of light received by the light-receiving unit 104 is reached to a given amount, the blade edge sensor 100 generates the blade edge detection signal. It is determined whether or not the blade edge detection signal is received by the slitter control section 210. When it is determined that the blade edge 21 has been detected (SB3: YES), the routine proceeds to step SB4. When it is determined that the blade edge 21 has not been detected (SB3: NO), the routine returns to the step SB2.

A lifting-lowing position PX of the X-th slitter head is temporarily stored in the RAM 230 (SB4). Specifically, the slitter control section 210 integrates the upward movement amounts sequentially supplied from the lifting-lowering control circuit 270, and when the blade edge 21 in the X-th slitter head is detected, temporarily stores, as the lifting-lowing position PX, the integrated upward movement amount in the RAM 230. The identification information X is currently set to "1". Thus, a lifting-lowing position P1 of the 1st slitter head is temporarily stored in the RAM 230.

A radius RX of the slitter blade in the X-th slitter head is calculated (SB5). Specifically, the radius RX of the slitter blade in the X-th slitter head is calculated, based on a difference in position between a reference lifting-lowing position at which, in a course of upward movement of a new slitter blade attached to the slitter head from the given lower position, a blade edge of the new slitter blade is detected, and the lifting-lowering position PX stored in the step SB4. The calculated radius RX is fixedly stored in the NVRAM 240. The identification information X is currently set to "1". Thus, a radius R1 of the slitter blade 20A in the 1st slitter head 2A is calculated based on the reference lifting-lowing position and the lifting-lowing position P1, and fixedly stored in the NVRAM 240.

It is determined whether or not the identification information X is "5" (SB6). When it is determined that the identification information X is "5" (SB6: YES), i.e., when radii of the slitter blades 20A to 20E in the slitter heads 2A to 2E are entirely calculated, the measurement control process is completed, and the routine returns to the main control process as depicted in FIG. 7. When it is determined that the identification information X is not "5" (SB6: NO), the routine proceeds to step SB7.

The slitter head identification information X is incremented by "1" (SB7). The identification information X is currently set to "1". Thus, the identification information X is incremented from "1" to "2". After executing the processing in the step SB7, the routine returns to the step SB2, and, for the 2nd slitter head 2B, the processing in the steps SB2 to SB7 will be repeated. When the measurement control process is executed for all of the five slitter heads 2A to 2E, a state in which respective current values of the radii R1 to R5 of the slitter blades 20A to 20E in the five slitter heads 2A to 2E are fixedly stored in the NVRAM 240 is established.

(Rotation Control Process)

Figure 9:
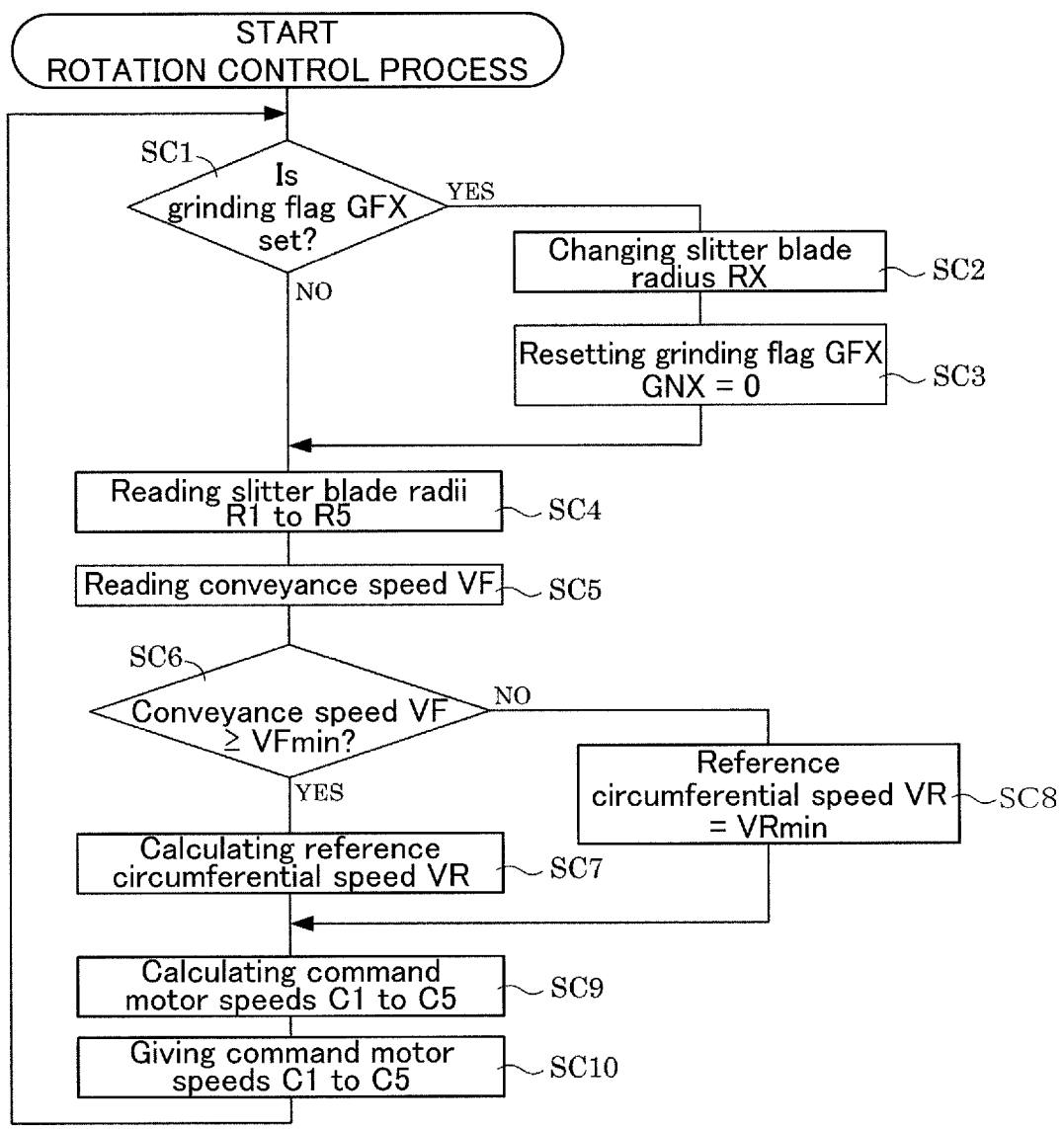
FIG. 9 is a flowchart depicting a rotation control process to be executed in the slitter according to the first embodiment.

With reference to FIG. 9, the rotation control process in the slitter 1 will be described. FIG. 9 is a flowchart depicting the rotation control process in the slitter 1. Processing in each step depicted in FIG. 9 is executed in the sub CPU of the slitter control section 210. Upon applying power to the slitter 1, the sub CPU operates to read the rotation control program from the ROM 220, and start to execute the rotation control process.

It is determined whether or not the grinding flag GFX corresponding to the X-th slitter head is set (SC1). Specifically, it is determined whether or not the grinding flag GFX set in the step SA6 is a grinding flag corresponding to the X-th slitter head. When it is determined that the grinding flag GFX corresponding to the X-th slitter head is set (SC1: YES), the routine proceeds to step SC2. When it is determined that the grinding flag GFX corresponding to the X-th slitter head is not set (SC1: NO), the routine proceeds to step SC4.

When it is determined that the grinding flag GFX corresponding to the X-th slitter head is set, the radius RX of the slitter blade in the X-th slitter head is changed (SC2). Specifically, on an assumption that, every time a slitter blade is grinded, a radius of the slitter blade is reduced by a given amount, the radius RX stored in the NVRAM 240 in the step SB5 is changed to a radius reduced by a value derived from multiplying the given value by the grinding number GNX stored in the NVRAM 240 in the step SA6, and the changed radius is fixedly stored as the radius RX in the NVRAM 240 again. In this embodiment, the above given amount by which the radius is reduced per grinding may be set in the range of 0.04 to 0.05 mm.

The grinding flag GFX corresponding to the X-th slitter head is reset, and the grinding number GNX is set to "0" (SC3). Specifically, the grinding flag GFX corresponding to the X-th slitter head stored in the NVRAM 240 is reset, and the resulting grinding flag GFX is fixedly stored in the NVRAM 240. Further, the grinding number GNX corresponding to the X-th slitter head stored in the NVRAM 240 is set to "0", and the resulting grinding number GNX is fixedly stored in the NVRAM 240.

The radii R1 to R5 of the slitter blades 20A to 20E are read from the NVRAM 240 (SC4). Specifically, the radii R1 to R5 of the slitter blades 20A to 20E are read from the NVRAM 240 and then temporarily stored in the RAM 230.

The actual conveyance speed VF is read (SC5). Specifically, the management apparatus 120 continuously measures the actual conveyance speed VF, based on a frequency of the pulse signal from the conveyance speed sensor 110. Based on the execution of the step SC5, the slitter control section 210 receives information indicative of the actual conveyance speed VF, from the management apparatus 120, and then temporarily stores it in the RAM 230.

It is determined whether or not the actual conveyance speed VF is equal to or greater than a given low speed VFmin (SC6). When it is determined that the actual conveyance speed VF is equal to or greater than the given low speed VFmin (SC6: YES), the routine proceeds to step SC7. When it is determined that the actual conveyance speed VF is not equal to or greater than the given low speed VFmin (SC6: NO), the routine proceeds to step SC8. In this embodiment, the given low speed VFmin may be set to a speed of 33.3 m/min. In this embodiment, the circumferential speed of the blade edge of the slitter blade is set to a value which is three times of the actual conveyance speed VF. In this case, however, as the actual conveyance speed VF becomes smaller, the circumferential speed of the blade edge becomes smaller, thereby possibly causing a problem of significant deterioration in cutting quality of the corrugated paperboard SH using the slitter blade. The given low speed VFmin is a lower limit circumferential speed at which a certain level of the cutting quality can be maintained, and can be experimentally determined.

When it is determined that the actual conveyance speed VF is equal to or greater than the given low speed VFmin, a reference circumferential speed VR is calculated (SC7). Specifically, the reference circumferential speed VR is calculated as a value derived from multiplying the actual conveyance speed VF by three, and temporarily stored in the RAM 230.

When it is determined that the actual conveyance speed VF is not equal to or greater than the given low speed VFmin, the reference circumferential speed VR is set as a lower limit circumferential speed VRmin (SC8). In this embodiment, the lower limit circumferential speed VRmin may be set to 100 m/min which is approximately equal to three times of the given low speed VFmin.

Command motor speeds C1 to C5 for the driving motors 72A to 72E in the slitter heads 2A to 2E are calculated (SC9). Specifically, the command motor speeds C1 to C5 for the driving motors 72A to 72E are calculated based on the reference circumferential speed VR and the radii R1 to R5 of the slitter blades 20A to 20E. For example, the command motor speed C1 (round/min) for the driving motor 72A is obtained by dividing the reference circumferential speed VR (m/min) by a product of $2\pi$ and radius R1 (m). The calculated command motor speeds C1 to C5 are temporarily stored in the RAM 230.

The command motor speeds C1 to C5 are given to the rotation control circuit 280 (SC10). The rotation control circuit 280 controls rotation of the driving motors 72A to 72E, individually, in such a manner as to allow each of the motor speeds of the driving motors 72A to 72E to become equal to a respective one of the command motor speeds C1 to C5. As a result, all of the circumferential speeds of the blade edges 21A to 21E of the slitter blades 20A to 20E become equal to the reference circumferential speed VR. In this embodiment, any slitter blade which is not used for cutting of the corrugated paper board SH is also rotated at the given lower position. After executing the step SC10, the routine returns to the step SC1.

[Effects in First Embodiment]

In the first embodiment, when the actual conveyance speed VF is equal to or greater than the given low speed VFmin, rotation of the driving motors 72A to 72E is controlled by the slitter control section 210 and the rotation control circuit 280, in such a manner as to allow all of the circumferential speeds of the blade edges 21A to 21E of the slitter blades 20A to 20E to become equal to the reference circumferential speed VR calculated based on the actual conveyance speed VF. As above, all of the circumferential speeds of the blade edges 21A to 21E of the slitter blades 20A to 20E become equal to the relatively high reference circumferential speed VR depending on the actual conveyance speed VF, so that a corrugated paperboard which has been cut is conveyed without obliquely traveling, and cut with high cutting quality.

In the first embodiment, when the actual conveyance speed VF is not equal to or greater than the given low speed VFmin, rotation of the driving motors 72A to 72E is controlled by the slitter control section 210 and the rotation control circuit 280, in such a manner as to allow all of the circumferential speeds of the blade edges 21A to 21E of the slitter blades 20A to 20E to become equal to the reference circumferential speed VR set to the lower limit circumferential speed VRmin. As above, all of the circumferential speeds of the blade edges 21A to 21E of the slitter blades 20A to 20E become equal to the fixed reference circumferential speed set to the lower limit circumferential speed VRmin, so that a corrugated paperboard which has been cut is conveyed without obliquely traveling, and cut while maintaining a certain level of cutting quality.

In the first embodiment, in the step SA6, the grinding number GNX, i.e., the number of times of grinding for the slitter blade 20, is counted. In the step SC2, the calculated slitter blade radius RX is changed based on the grinding number GNX and the given amount. Therefore, it becomes possible to accurately calculate the slitter blade radius RX which is to be reduced by the given amount per grinding. Further, the command motor speeds C1 to C5 are calculated based on the radius RX calculated according to the grinding number GNX, and the reference circumferential speed VR, so that it becomes possible to allow all of the circumferential speeds of the blade edges 21A to 21E of the slitter blades 20A to 20E to accurately become equal to the reference circumferential speed VR, and reliably reduce the oblique travel of a corrugated paperboard which has been cut.

In the first embodiment, when an operator manually operates the measurement command button 254 after considering a cut state of a corrugated paperboard SH and a cumulative total time of cutting, the measurement control process SA8 is executed, and, in the step SB5, a current value of the slitter blade radius RX is calculated. The rotation control process is started by applying power to the slitter 1, and continually executed during cutting performed by the slitter 1. Thus, upon calculation of a current value of the radius RX, the current value of the radius RX can be immediately read so as to calculate the command motor speeds C1 to C5. Therefore, it becomes possible to allow all of the circumferential speeds of the blade edges 21A to 21E of the slitter blades 20A to 20E to accurately become equal to the reference circumferential speed VR, and reliably reduce the oblique travel of a corrugated paperboard which has been cut.

<Second Embodiment>

With reference to FIGS. 10 to 13, a slitter 1 according to a second embodiment of the present invention will be described below. The second embodiment is different from the first embodiment, in terms of the configuration of the blade edge sensor, a part of the measurement control process, and the rotation control process. In the second embodiment, the same element or component as that in the first embodiment will be described while being assigned with the same reference numeral or sign.

Five slitter heads 2A to 2E are equipped, respectively, with five blade edge sensors 400A to 400E. Each of the slitter heads 2A to 2E has the same configuration, and therefore only the slitter head 2A will be described as a representative example.

[Detail Configuration of Slitter Head 2A]

Figure 10:
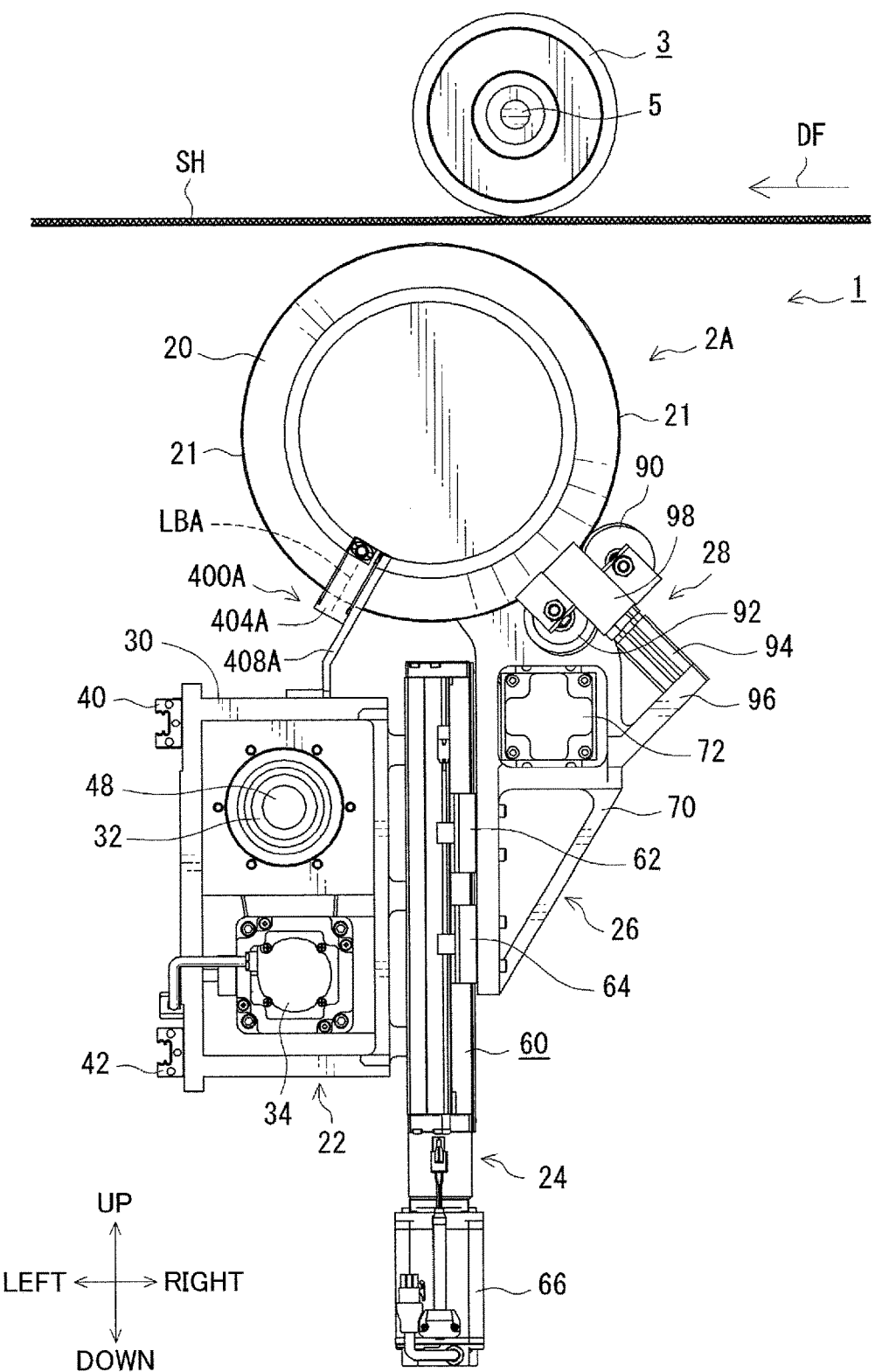
FIG. 10 is an enlarged front view of a slitter according to a second embodiment of the present invention, in a state in which a slitter blade is spaced apart from a blade receiving roll.

Except that the blade edge sensor 400A and a mounting structure for the blade edge sensor 400A, the slitter head 2A in the second embodiment has the same configuration as that of the slitter head 2A in the first embodiment. Thus, the blade edge sensor 400A and the mounting structure for the blade edge sensor 400A will be described with reference to FIGS. 10 and 11. FIG. 10 is a front view of the slitter 1 in a state in which a slitter blade 20 is spaced apart from a blade receiving roll 3, and FIG. 11 is a perspective view of the slitter head 2A of the slitter 1, when viewed obliquely frontwardly from a rear left side thereof.

Figure 11:
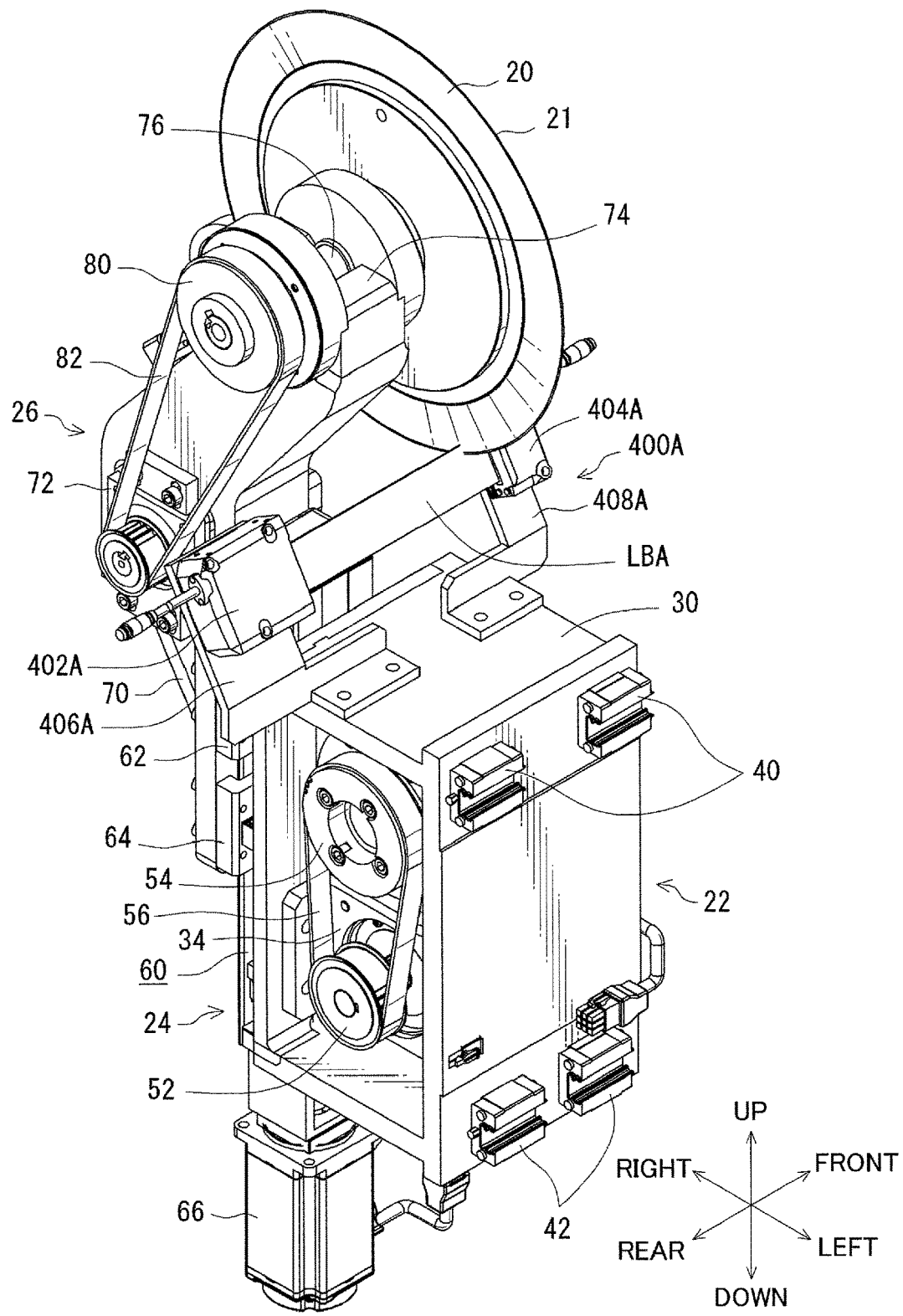
FIG. 11 is a perspective view of a slitter head in the slitter according to the second embodiment, when viewed obliquely frontwardly from a rear left side thereof.

In FIG. 11, the blade edge sensor 400A is composed of an optical sensor which comprises a light-emitting unit 402A and a light-receiving unit 404A. A pair of sensor mounting members 406A, 408A is fixed, respectively, at rear and front positions on an upper surface of a movable block 30 by a fastening device such as a screw, in such a manner that they are located, respectively, on front and rear sides of the slitter blade 20. The light-emitting unit 402A is attached to the sensor mounting member 406A. The light-receiving unit 404A is attached to the sensor mounting member 408A. As depicted in FIG. 11, the light-emitting unit 402A is configured to emit a strip-like laser beam LBA toward the light-receiving unit 404A. The light-emitting unit 402A and the light-receiving unit 404 are attached, respectively, to the two sensor mounting members 406A, 408A at positions close to an extension of a lifting-lowering path in a guide block 60 in a right-to-left direction (conveyance direction), so as to detect a point close to a lowermost point of a blade edge 21 of the slitter blade 20 when the slitter blade 20 is spaced apart from the blade receiving roll 3. The blade edge sensor 400A is configured to generate a blade edge detection signal when the laser beam LBA is partially blocked by the blade edge 21 of the slitter blade 20, and thereby an amount of light received by the light-receiving unit 404A is reduced to a given value. In this embodiment, a digital laser sensor produced by Keyence Corporation is used as the blade edge sensor 400A.

[Electrical Configuration of Slitter 1]

An electrical structure of the slitter 1 according to the second embodiment will be described below. In the electrical structure of the slitter 1 according to the second embodiment, each of the five blade edge sensors 400A to 400E is connected to a slitter control section 210, in place of the one blade edge sensor 100 in the electrical structure of the slitter 1 according to the first embodiment depicted in FIG. 6. In the electrical structure of the slitter 1 according to the second embodiment, the ROM 220 fixedly stores therein various control programs, such as the main control program for executing the main control process depicted in FIG. 7, and the measurement control program for executing the measurement control process depicted in FIG. 8, and various set values. In the electrical structure of the slitter 1 according to the second embodiment, the ROM 220 also fixedly stores therein a rotation control program for executing a rotation control process depicted in FIG. 13, instead of the rotation control program for executing the rotation control process depicted in FIG. 9 in the first embodiment.

[Operation and Function in First Embodiment]

An operation and function of the slitter 1 according to the second embodiment will be described below. The operation and function of the slitter 1 according to the second embodiment is different from those of the slitter 1 according to the first embodiment, in terms of a part of the measurement control process, and the rotation control process.

(Difference in Measurement Control Process)

The measurement control process in the second embodiment is different from that in the first embodiment depicted in FIG. 8, in terms of the step SB2. Thus, only this difference will be described below.

In the first embodiment, when the identification information X is set to "1", the measurement rotation control command in regard to the lifting-lowering motor 66A in the 1st slitter head 2A is supplied to the lifting-lowering control circuit 270, and simultaneously, the retraction rotation control command in regard to the lifting-lowering motors 66B to 66E in the remaining slitter heads 2B to 2E is supplied to the lifting-lowering control circuit 270. On the other hand, in the second embodiment, the slitter heads 2A to 2E are equipped, respectively, with the blade edge sensors 400A to 400E, so that it is not necessary to position the remaining slitter heads 2B to 2E at a given upper position during a period in which a radius of the slitter blade 20A in the slitter head 2A is measured.

In the second embodiment, when a processing equivalent to that in the step SB2 is executed, rotation of a lifting-lowering motor is controlled in regard to only the X-th slitter head. For example, in the case where the identification information X is set to "1", the measurement rotation control command in regard to the lifting-lowering motor 66A in the 1st slitter head 2A is supplied to the lifting-lowering control circuit 270. Then, the lifting-lowering control circuit 270 controls rotation of the lifting-lowering motor 66A in such a manner as to allow the slitter head 2A to be lowered to the given lower position. After the slitter head 2A is positioned at the given lower position, the lifting-lowering control circuit 270 controls rotation of the lifting-lowering motor 66A according to the measurement rotation control command, in such a manner as to allow the slitter head 2A to be lifted upwardly from the given lower position, and, based on an amount of rotation of the lifting-lowering motor 66A, calculates an amount of upward movement of the slitter head 2A with respect to the given lower position. The lifting-lowering control circuit 270 supplies the calculated upward movement amount to the slitter control section 210. The slitter control section 210 sequentially integrates the supplied upward movement amounts, and temporarily stores the integrated value in the RAM 230.

Figure 12:
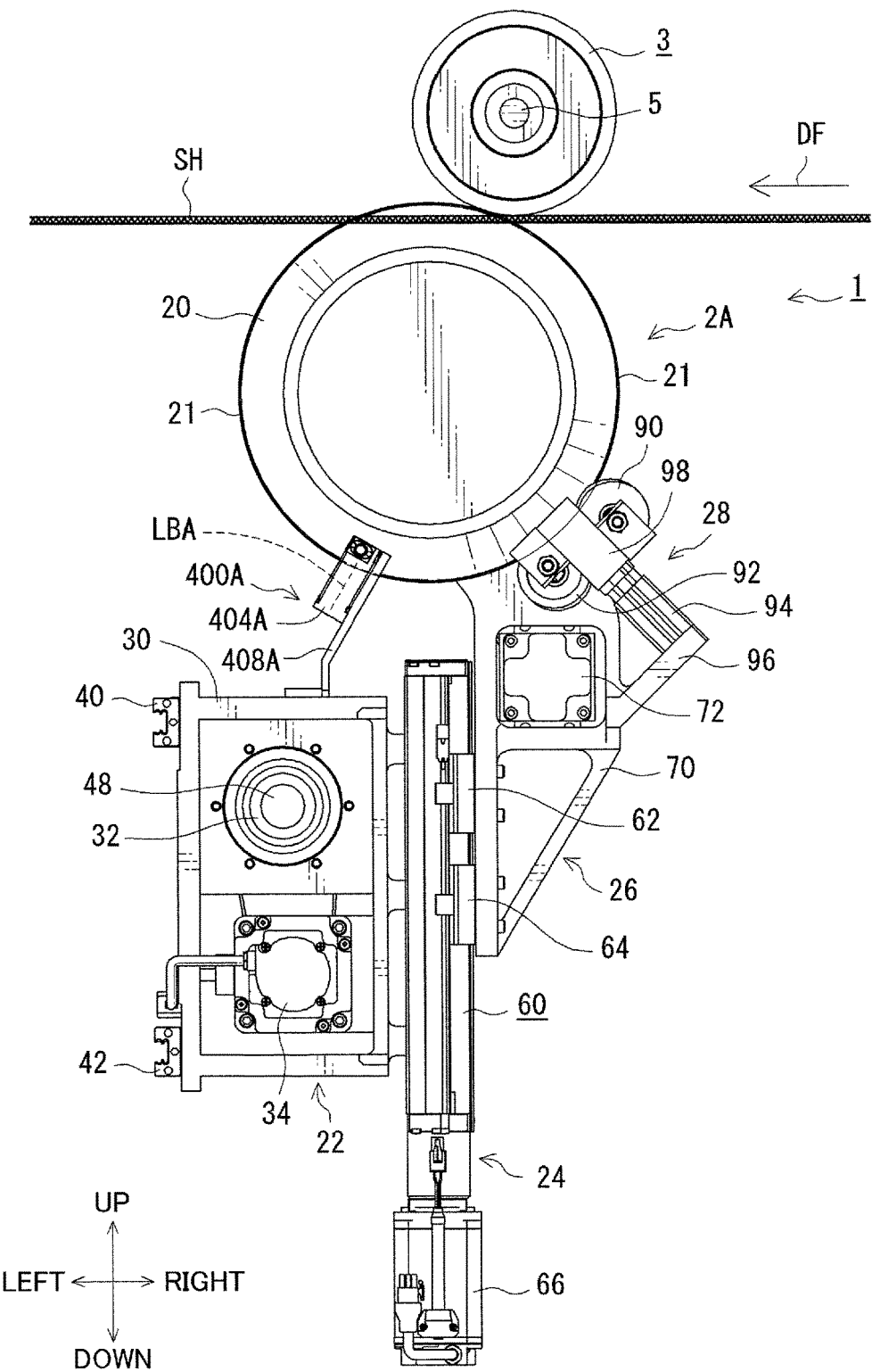
FIG. 12 is an enlarged front view of the slitter according to the second embodiment, in a state in which the slitter blade is engaged with the blade receiving roll.

FIG. 10 depicts a state when the laser beam LBA indicated by the broken line is partially blocked by the blade edge 21A of the slitter blade 20A in a course of upward movement of the slitter head 2A from the given lower position. On the other hand, FIG. 12 depicts a state in which the blade edge 21A of the slitter blade 20A is engaged with the blade receiving roll 3, wherein the laser beam LBA indicated by the broken line is almost not blocked by the blade edge 21A of the slitter blade 20A.

(Rotation Control Process)

Figure 13:
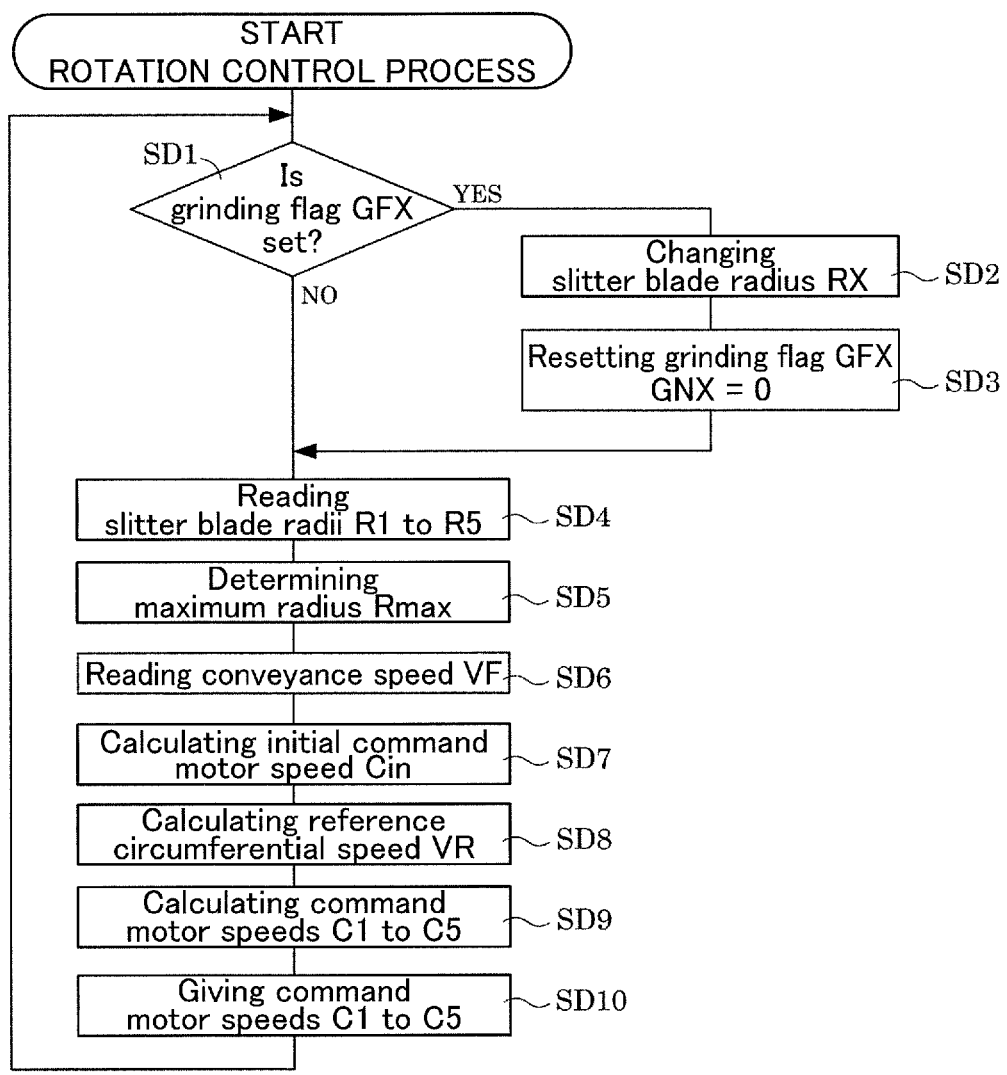
FIG. 13 is a flowchart depicting a rotation control process to be executed in the slitter according to the second embodiment.

With reference to FIG. 13, the rotation control process in the slitter 1 will be described. FIG. 13 is a flowchart depicting the rotation control process in the slitter 1. Processing in each step depicted in FIG. 13 is executed in the sub CPU of the slitter control section 210. Upon applying power to the slitter 1, the sub CPU operates to read the rotation control program from the ROM 220, and start to execute the rotation control process.

It is determined whether or not the grinding flag GFX corresponding to the X-th slitter head is set (SD1). Specifically, it is determined whether or not the grinding flag GFX set in the step SA6 is a grinding flag corresponding to the X-th slitter head. When it is determined that the grinding flag GFX corresponding to the X-th slitter head is set (SD1: YES), the routine proceeds to step SD2. When it is determined that the grinding flag GFX corresponding to the X-th slitter head is not set (SD1: NO), the routine proceeds to step SD4.

When it is determined that the grinding flag GFX corresponding to the X-th slitter head is set, the radius RX of the slitter blade in the X-th slitter head is changed (SD2). Specifically, on an assumption that, every time a slitter blade is grinded, a radius of the slitter blade is reduced by a given amount, the radius RX stored in the NVRAM 240 in the step SB5 is changed to a radius reduced by a value derived from multiplying the given value by the grinding number GNX stored in the NVRAM 240 in the step SA6, and the changed radius is fixedly stored as the radius RX in the NVRAM 240 again. In this embodiment, the above given amount by which the radius is reduced per grinding may be set in the range of 0.04 to 0.05 mm.

The grinding flag GFX corresponding to the X-th slitter head is reset, and the grinding number GNX is set to "0" (SD3). Specifically, the grinding flag GFX corresponding to the X-th slitter head stored in the NVRAM 240 is reset, and the resulting grinding flag GFX is fixedly stored in the NVRAM 240. Further, the grinding number GNX corresponding to the X-th slitter head stored in the NVRAM 240 is set to "0", and the resulting grinding number GNX is fixedly stored in the NVRAM 240.

The radii R1 to R5 of the slitter blades 20A to 20E are read (SD4). Specifically, the radii R1 to R5 stored in the NVRAM 240 in the step SB5 or SB7 are read, and then temporarily stored in the RAM 230.

A maximum radius Rmax is determined (SD5). Specifically, a largest one of the radii R1 to R5 temporarily stored in the RAM 230 is determined as the radius Rmax.

The actual conveyance speed VF is read (SD6). Specifically, the management apparatus 120 continuously measures the actual conveyance speed VF, based on a frequency of the pulse signal from the conveyance speed sensor 110. Based on the execution of the step SD6, the slitter control section 210 receives information indicative of the actual conveyance speed VF, from the management apparatus 120, and then temporarily stores it in the RAM 230.

An initial command motor speed Cin is calculated (SD7). Specifically, the initial command motor speed Cin is calculated based on the actual conveyance speed VF, and a radius of a new slitter blade. For example, the initial command motor speed Cin (round/min) is calculated as a value derived from dividing the actual conveyance speed VF (m/min) by a product of $2\pi$ and a radius (m) of a new slitter blade, and multiplying the resulting quotient by three.

A reference circumferential speed VRmax is calculated (SD8). Specifically, the reference circumferential speed VRmax is calculated based on the largest radius Rmax and the initial command motor speed Cin. For example, the reference circumferential speed VRmax (m/min) is calculated as a value derived from multiplication of the largest radius Rmax, $2\pi$ and the initial command motor speed Cin.

Command motor speeds C1 to C5 are calculated (SD9). Specifically, the command motor speeds C1 to C5 for the driving motors 72A to 72E in the slitter heads 2A to 2E are calculated based on the reference circumferential speed VRmax and the radii R1 to R5 of the slitter blades 20A to 20E. For example, the command motor speed C1 (round/min) is calculated as a value derived from dividing the reference circumferential speed VRmax (m/min) by a product of $2\pi$ and the radius R1 (m) of the slitter blade 20A. The calculated command motor speeds C1 to C5 are temporarily stored in the RAM 230.

The command motor speeds C1 to C5 are given to the rotation control circuit 280 (SD10). The rotation control circuit 280 controls rotation of the driving motors 72A to 72E, individually, in such a manner as to allow each of the motor speeds of the driving motors 72A to 72E to become equal to a respective one of the command motor speeds C1 to C5. As a result, all of the circumferential speeds of the blade edges 21A to 21E of the slitter blades 20A to 20E become equal to the reference circumferential speed VRmax. In this embodiment, any slitter blade which is not used for cutting of the corrugated paper board SH is also rotated at the given lower position. After executing the step SD10, the routine returns to the step SD1.

[Effects in Second Embodiment]

In the second embodiment, the five blade edge sensors 400A to 400E are provided, respectively, in the five slitter heads 2A to 2E. Thus, as compared to the configuration of the first embodiment in which respective radii of the slitter heads 2A to 2E are measured by the one blade edge sensor 1, it becomes possible to simply and quickly execute processing corresponding to that in the step SB2 in the measurement control process SA8, without any need to control the lifting-lowering operation in the slitter heads, except for one slitter head to be measured.

In the second embodiment, in the step SD5, among the radii R1 to R5 of the slitter blades 20A to 20E, the largest radius Rmax is determined. Then, rotation of the driving motors 72A to 72E is controlled by the slitter control section 210 and the rotation control circuit 280, in such a manner as to allow all of the circumferential speeds of the blade edges 21A to 21E of the slitter blades 20A to 20E to become equal to the reference circumferential speed VR calculated based on the largest radius Rmax. As above, all of the circumferential speeds of the blade edges 21A to 21E of the slitter blades 20A to 20E become equal to the relatively high reference circumferential speed VR depending on the largest radius Rmax, so that a corrugated paperboard which has been cut is conveyed without obliquely traveling, and cut with high cutting quality.

<Modifications>

It should be noted that the present invention is not limited to the first and second embodiments, but various modifications may be made therein without departing from the spirit and scope thereof as set forth in the appended claims. Some examples of such modifications will be described below.

(1) In the first embodiment, depending on whether or not the actual conveyance speed VF is equal to or greater than the given low speed VFmin, the reference circumferential speed VR is calculated based on the actual conveyance speed VF, or is set to the lower limit circumferential speed VRmin. However, the present invention is not limited thereto. For example, the reference circumferential speed VR may be set to a fixed circumferential speed sufficiently greater than the lower limit circumferential speed VRmin.

(2) In the second embodiment, the reference circumferential speed VRmax is calculated based on the largest radius Rmax among the radii R1 to R5 of the slitter blades 20A to 20E. However, the present invention is not limited thereto. For example, the reference circumferential speed VRmax may be calculated based on an average value of the radii R1 to R5 of the slitter blades 20A to 20E.

(3) In the first and second embodiments, the actual conveyance speed VF measured based on a frequency of the pulse signal from the conveyance speed sensor 110 is used in the rotation control process. However, the present invention is not limited thereto. For example, instead of the actual conveyance speed VF, it is possible to use a conveyance speed to be instructed for each order, or a conveyance speed to be instructed by an operator through the operation panel.

(4) In the first and second embodiments, the measurement control process SA8 is independent from the grinding control processing in the step SA5 and the processing in the step SA6. However, the present invention is not limited thereto. For example, in the step SA6, only the setting of the grinding flag GFX may be performed without performing the counting of the grinding number GNX, and the measurement control process SA8 may be successively performed just after the execution of the step SA6. In this modification, the measurement command button 254, the determination processing in the step SA7 and the step SC3 or SD3 become unnecessary.

(5) In the first and second embodiments, in the step SB5, the radii R1 to R5 of all of the slitter blades 20A to 20E are calculated. However, the present invention is not limited thereto. For example, in the case where the measurement control process SA8 is executed before start of each order, radii of only ones of the slitter blades to be used in the next order may be calculated to calculate command motor speeds.

(6) In the first and second embodiments, in the strep SC2 or SD2, the slitter blade radius RX is changed depending on the grinding number GNX. However, the present invention is not limited thereto. For example, in the case where the measurement control process is executed within a relatively short period of time, for example, before start of each order, the steps SC1 to SC3 or the steps SD1 to SD3 may be omitted.

(7) In the first and second embodiments, the rotation control process is started in response to applying power to the slitter 1, and continually executed during cutting performed by the slitter 1. However, the present invention is not limited thereto. For example, the rotation control process may be executed only in a specific order which is likely to cause the phenomenon of oblique travel, in view of conditions such as a thickness, an overall crosswise dimension and board properties, of a corrugated paperboard to be processed in each order.

What is claimed is:

1. A slitter comprising:
a plurality of slitter heads arranged along and positionally adjustably in a width direction perpendicular to a conveyance direction of a corrugated paperboard, each of the plurality of slitter heads including a circular slitter blade and a drive motor for rotating the slitter blade;
a blade radius acquisition unit operable to acquire respective radii of the plurality of slitter blades; and
a control unit operable, based on the radii of the plurality of slitter blades acquired by the blade radius acquisition unit, to control respective rotational speeds of the plurality of drive motors so as to allow respective blade edges of the plurality of slitter blades to have a same circumferential speed,
wherein the control unit includes:
a reference circumferential speed acquisition section operable to acquire a reference circumferential speed of the blade edge of each of the slitter blades;
a command speed calculation section operable, based on the radii of the plurality of slitter blades acquired by the blade radius acquisition unit, and the reference circumferential speed, to calculate respective command speeds for the plurality of drive motors; and
a speed control section operable, according to the calculated command speeds, to control the respective rotational speeds of the plurality of drive motors, and
wherein the reference circumferential speed acquisition section determines the reference circumferential speed in such a manner that the reference circumferential speed is a speed calculated from the conveyance speed of the corrugated paperboard, while the conveyance speed of the corrugated paperboard is equal to or greater than a predetermined conveyance speed, and the reference circumferential speed is a fixed predetermined circumferential speed while the conveyance speed of the corrugated paperboard is less than the predetermined conveyance speed.

2. The slitter according to claim 1, wherein the reference circumferential speed acquisition section acquires, as the reference circumferential speed, a circumferential speed of the blade edge of a specific one of the plurality of slitter blades which has a largest radius among the radii of the plurality of slitter blades acquired by the blade radius acquisition unit, and wherein the command speed calculation section, based on the radii of the plurality of slitter blades acquired by the blade radius acquisition unit, and the reference circumferential speed, calculates respective command speeds for the drive motors configured to rotate the respective remaining slitter blades other than the specific slitter blade, and the speed control section, according to the calculated command speeds, controls respective rotational speeds of the drive motors for rotating the remaining slitter blades.

3. The slitter according to claim 1, wherein the blade radius acquisition unit includes a plurality of measurement units each disposed in a respective one of the plurality of slitter heads to measure a respective one of the radii of the plurality of slitter blades.

* * * * *